US012652283B2

(12) United States Patent
Chae

(10) Patent No.: US 12,652,283 B2
(45) Date of Patent: Jun. 9, 2026

(54) AUTHENTICATION SYSTEM, AUTHENTICATION METHOD, AND PROGRAM

(71) Applicant: Rakuten Group, Inc., Tokyo (JP)

(72) Inventor: Yeongnam Chae, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 627 days.

(21) Appl. No.: 18/018,001

(22) PCT Filed: Dec. 29, 2021

(86) PCT No.: PCT/JP2021/049015
§ 371 (c)(1),
(2) Date: Jan. 25, 2023

(87) PCT Pub. No.: WO2023/127160
PCT Pub. Date: Jul. 6, 2023

(65) Prior Publication Data
US 2025/0071110 A1 Feb. 27, 2025

(51) Int. Cl.
*H04L 9/40* (2022.01)
(52) U.S. Cl.
CPC .... *H04L 63/0861* (2013.01); *H04L 2463/082* (2013.01)
(58) Field of Classification Search
None
See application file for complete search history.

(56) References Cited

U.S. PATENT DOCUMENTS 6,128,735 A 10/2000 Goldstein et al.
10,862,873 B1 * 12/2020 Carru ................... H04L 9/3073
(Continued)

FOREIGN PATENT DOCUMENTS

JP 5-102961 A 4/1993
JP 9-83506 A 3/1997
(Continued)

OTHER PUBLICATIONS

Menezes et al. (Alfred J. Menezes, Paul C. van Oorschot, Scott A. Vanstone, "Handbook of applied cryptography", 1997, ISBN: 0849385237) (Year: 1997).*
(Continued)

*Primary Examiner* — Piotr Poltorak
(74) *Attorney, Agent, or Firm* — Sughrue Mion, PLLC

(57) ABSTRACT
An authentication system, comprising: a user device; and an authentication device, wherein the user device is configured to: acquire transformation information for transforming authentication information different from biometric information; transform the authentication information based on the transformation information; and transmit, to the authentication device, the transformed authentication information and the biometric information, and wherein the authentication device is configured to: receive, from the user device, the transformed authentication information and the biometric information; acquire inverse transformation information for inversely transforming the transformed authentication information; inversely transform the transformed authentication information based on the inverse transformation information; and execute multi-factor authentication based on the authentication information inversely transformed by the authentication device and the biometric information.

16 Claims, 17 Drawing Sheets

(56)                    References Cited

U.S. PATENT DOCUMENTS

| | | | |
|---|---|---|---|
| 2006/0112272 A1* | 5/2006 | Morioka | H04L 63/0263 |
| | | | 713/171 |
| 2006/0136732 A1* | 6/2006 | Vandermolen | G06F 21/6218 |
| | | | 713/178 |
| 2006/0204003 A1 | 9/2006 | Takata et al. | |
| 2006/0291662 A1 | 12/2006 | Takahashi et al. | |
| 2007/0133800 A1* | 6/2007 | Kim | H04L 63/0428 |
| | | | 380/256 |
| 2007/0156829 A1* | 7/2007 | Deboy | G06F 21/33 |
| | | | 709/206 |
| 2009/0007257 A1 | 1/2009 | Hirata et al. | |
| 2011/0167264 A1 | 7/2011 | Takahashi et al. | |
| 2016/0050291 A1* | 2/2016 | Haug | H04W 12/0431 |
| | | | 709/217 |
| 2018/0241728 A1* | 8/2018 | Burgess | H04L 9/3215 |
| 2019/0052632 A1 | 2/2019 | Takagi | |
| 2021/0374219 A1 | 12/2021 | Suwa et al. | |

FOREIGN PATENT DOCUMENTS

| | | | | |
|---|---|---|---|---|
| JP | 2689383 | B2 | | 12/1997 |
| JP | 2001-524771 | A | | 12/2001 |
| JP | 2002-259343 | A | | 9/2002 |
| JP | 2002-290397 | A | | 10/2002 |
| JP | 2004318691 | | * | 4/2003 |
| JP | 2003-338814 | A | | 11/2003 |
| JP | 2004-318691 | A | | 11/2004 |
| JP | 2006-238273 | A | | 9/2006 |
| JP | 2006-340296 | A | | 12/2006 |
| JP | 2007-156785 | A | | 6/2007 |
| JP | 4966765 | B2 | | 7/2012 |
| JP | WO2020085141 | A1 | | 4/2020 |
| JP | 6866803 | B2 | | 4/2021 |

OTHER PUBLICATIONS

International Search Report for PCT/JP2021/049015 dated Apr. 12, 2022 [PCT/ISA/210].
Extended European Search Report dated Jul. 24, 2023 in European Application No. 21950374.5.
Japanese Office Action dated Aug. 8, 2023 in Japanese Application No. 2023-540796.
Davies et al., "Security for Computer Networks", Nikkei McGraw-Hill, Inc., Dec. 5, 1985, pp. 136-138 (5 pages total).

* cited by examiner

| DAY | TIME SLOT | SALT |
|---|---|---|
| 01 | 00 | 7438 |
|  | 01 | 4214 |
|  | 02 | 2256 |
|  | 03 | 3101 |
|  | . . . | . . . |
|  | 23 | 8201 |
| 02 | 00 | 6435 |
|  | 01 | 8414 |
|  | 02 | 9436 |
|  | 03 | 2981 |
|  | . . . | . . . |
|  | 23 | 1983 |
| . . . | . . . | . . . |
| 31 | 00 | 3908 |
|  | 01 | 3871 |
|  | 02 | 7392 |
|  | 03 | 9823 |
|  | . . . | . . . |
|  | 23 | 2121 |

| USER ID | PASSWORD | FULL NAME | TUID | PHOTOGRAPH OF FACE | FEATURE AMOUNT OF FACE |
|---|---|---|---|---|---|
| taro.yamada123 | ********** | TARO YAMADA | 312456 | 00001.jpg | (a1,b2,c3,····) |
| hanako.suzuki999 | ****** | HANAKO SUZUKI | 409193 | 00002.jpg | (a2,b2,c2,····) |
| jiro.kimura1010 | ******** | JIRO KIMURA | 225091 | 00003.jpg | (a3,b3,c3,····) |
| · · · | · · · | · · · | · · · | · · · | · · · |

FIG.16

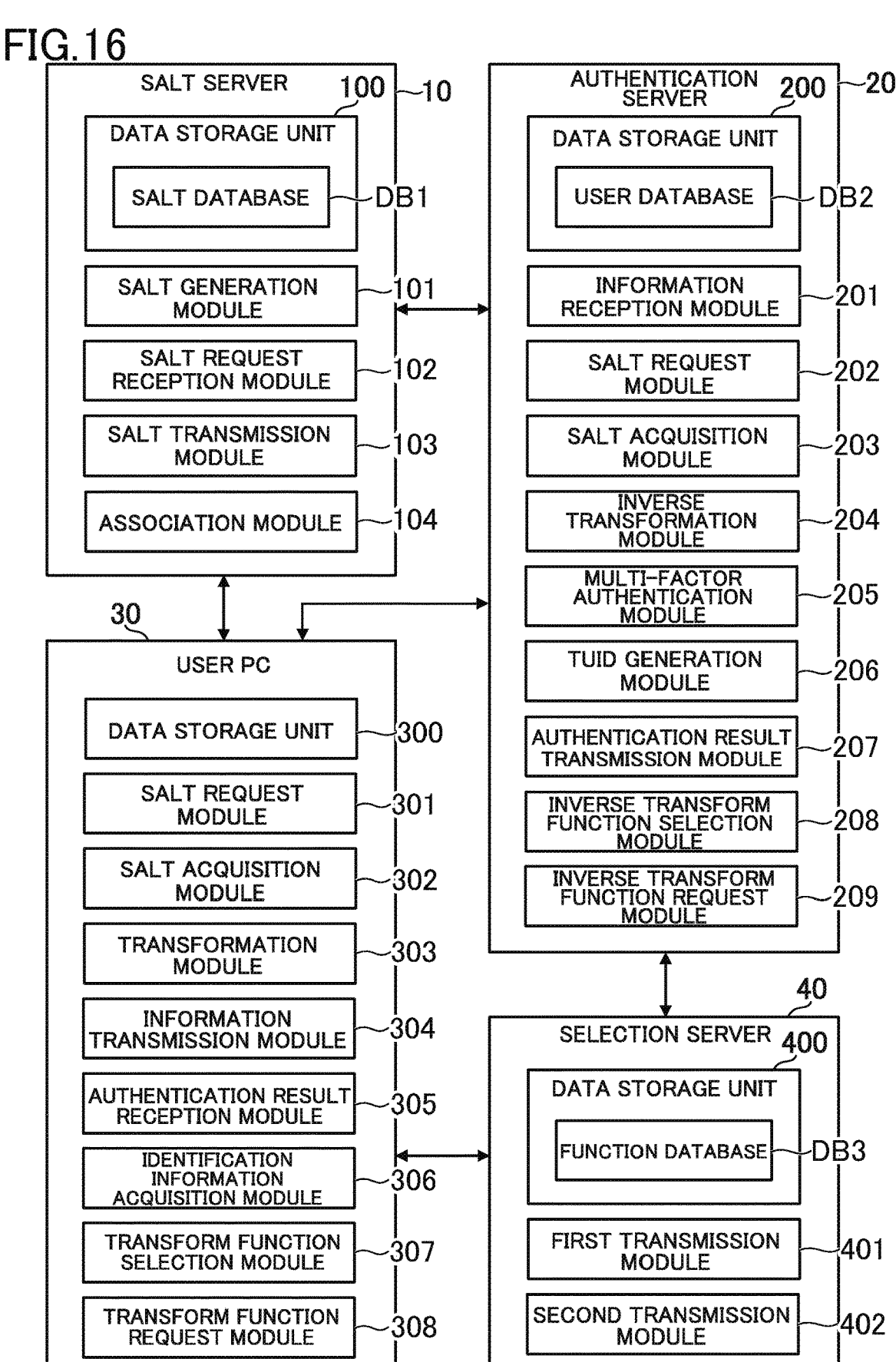

SALT SERVER                    100    10

DATA STORAGE UNIT

SALT DATABASE    DB1

SALT GENERATION MODULE    101

SALT REQUEST RECEPTION MODULE    102

SALT TRANSMISSION MODULE    103

ASSOCIATION MODULE    104

30

USER PC

DATA STORAGE UNIT    300

SALT REQUEST MODULE    301

SALT ACQUISITION MODULE    302

TRANSFORMATION MODULE    303

INFORMATION TRANSMISSION MODULE    304

AUTHENTICATION RESULT RECEPTION MODULE    305

IDENTIFICATION INFORMATION ACQUISITION MODULE    306

TRANSFORM FUNCTION SELECTION MODULE    307

TRANSFORM FUNCTION REQUEST MODULE    308

AUTHENTICATION SERVER    200    20

DATA STORAGE UNIT

USER DATABASE    DB2

INFORMATION RECEPTION MODULE    201

SALT REQUEST MODULE    202

SALT ACQUISITION MODULE    203

INVERSE TRANSFORMATION MODULE    204

MULTI-FACTOR AUTHENTICATION MODULE    205

TUID GENERATION MODULE    206

AUTHENTICATION RESULT TRANSMISSION MODULE    207

INVERSE TRANSFORM FUNCTION SELECTION MODULE    208

INVERSE TRANSFORM FUNCTION REQUEST MODULE    209

40

SELECTION SERVER    400

DATA STORAGE UNIT

FUNCTION DATABASE    DB3

FIRST TRANSMISSION MODULE    401

SECOND TRANSMISSION MODULE    402

AUTHENTICATION SYSTEM, AUTHENTICATION METHOD, AND PROGRAM

CROSS REFERENCE TO RELATED APPLICATIONS

This application is a National Stage of International Application No. PCT/JP2021/049015 filed Dec. 29, 2021.

TECHNICAL FIELD

The present disclosure relates to an authentication system, an authentication method, and a program.

BACKGROUND ART

Hitherto, there has been known multi-factor authentication, which is an authentication method that combines a plurality of factors. For example, in Patent Literature 1, there is described multi-factor authentication using a user ID input by a user and biometric information transformed through use of a user parameter generated based on the user ID. In Patent Literature 2, there is described a technology for, in place of multi-factor authentication, executing biometric authentication by transforming biometric information based on a salt generated at random. In Patent Literature 3, there is described multi-factor authentication, in which challenge-and-response using a user-identifiable network account, a public key, and a secret key is executed when biometric authentication is successful.

CITATION LIST

Patent Literature

[PTL 1] JP 4966765 B2
[PTL 2] JP 6866803 B2
[PTL 3] JP WO 2020/85141 A1

SUMMARY OF INVENTION

Technical Problem

However, in Patent Literature 1, a user ID is transmitted over a network in order to generate a user parameter, and there is a possibility that the user ID may be stolen by a malicious third party. Thus, security in multi-factor authentication cannot be sufficiently enhanced. The technology of Patent Literature 2 does not assume multi-factor authentication in the first place. In the technology of Patent Literature 3, a network account is transmitted over a network after biometric authentication is successful, and there is a possibility that the network account may be stolen by a malicious third party. Thus, security in multi-factor authentication cannot be sufficiently enhanced.

One of objects of the present disclosure is to enhance security in multi-factor authentication.

Solution to Problem

According to one aspect of the present disclosure, there is provided an authentication system including: a user device; and an authentication device, wherein the user device includes: a transformation information acquisition module configured to acquire transformation information for transforming authentication information different from biometric information; a transformation module configured to transform the authentication information based on the transformation information; and an information transmission module configured to transmit, to the authentication device, the transformed authentication information and the biometric information, and wherein the authentication device includes: an information reception module configured to receive, from the user device, the transformed authentication information and the biometric information; an inverse transformation information acquisition module configured to acquire inverse transformation information for inversely transforming the transformed authentication information; an inverse transformation module configured to inversely transform the transformed authentication information based on the inverse transformation information; and a multi-factor authentication module configured to execute multi-factor authentication based on the authentication information inversely transformed by the inverse transformation module and the biometric information.

Advantageous Effects of Invention

According to the present disclosure, the security in the multi-factor authentication is enhanced.

BRIEF DESCRIPTION OF DRAWINGS

FIG. 4 is a table for showing an example of a salt database.

FIG. 5 is a table for showing an example of a user database.

FIG. 16 is a diagram for illustrating an example of functional blocks implemented by the authentication system according to the sixth embodiment.

DESCRIPTION OF EMBODIMENTS

1. First Embodiment

An authentication system according to a first embodiment of the present disclosure, which is an exemplary embodiment of the present disclosure, is described.

[1-1. Overall Configuration of Authentication System]

Figure 1:
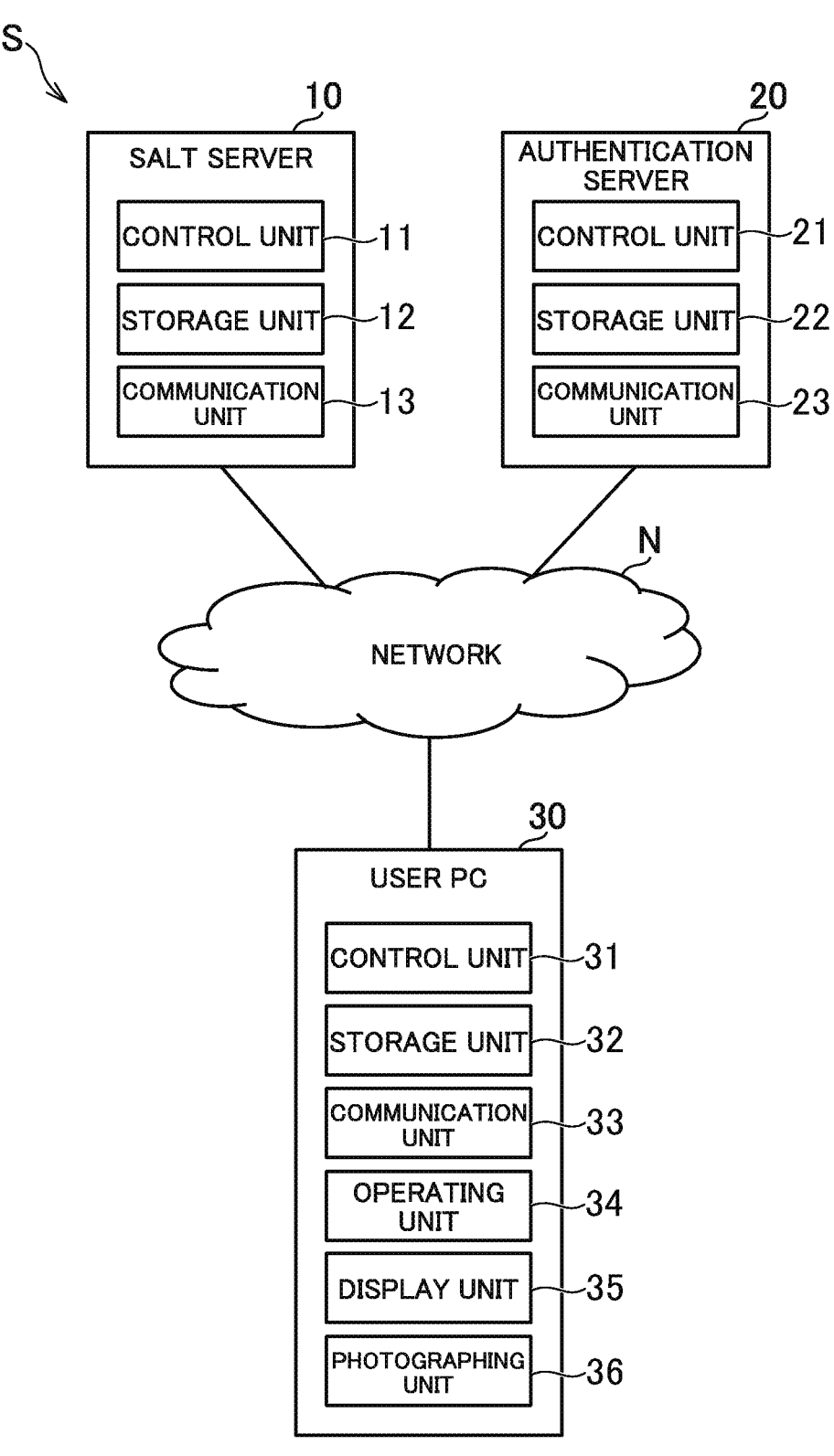
FIG. 1 is a diagram for illustrating an example of an overall configuration of an authentication system.

FIG. 1 is a diagram for illustrating an example of an overall configuration of the authentication system. As illustrated in FIG. 1, an authentication system S includes a salt server 10, an authentication server 20, and a user PC 30. The salt server 10, the authentication server 20, and the user PC 30 can be connected to a network N such as the Internet or a LAN. The authentication system S is only required to include at least one computer, and is not limited to the example of FIG. 1.

The salt server 10 is a server computer. A control unit 11 includes at least one processor. A storage unit 12 includes a volatile memory such as a RAM, and a nonvolatile memory such as a hard disk drive. A communication unit 13 includes at least one of a communication interface for wired communication or a communication interface for wireless communication. The salt server 10 is an example of a management device. Accordingly, the salt server 10 as used herein can be read as "management device."

The management device is a device that manages salts in cryptography. A information salt is for transforming information to be transformed. The salt is the information to be input to a transform function together with the information to be transformed. The transformation may also be called "encryption" or "hashing." The transformation is reversible. Transformed information can be restored to information that has not been transformed by inverse transformation. Managing salts refers to storing salts.

As for the salt itself, a publicly known salt can be used. For example, the salt is a random value. The salt can have any format, such as numbers, characters, other symbols, or a combination thereof. The management device may generate a salt, or the salt generation itself may be performed by a device other than the management device. The management device may be any device, and is not limited to the salt server 10 or another server computer. For example, the management device may be a personal computer, a tablet terminal, or a smartphone.

The authentication server 20 is a server computer. Physical configurations of a control unit 21, a storage unit 22, and a communication unit 23 may be the same as those of the control unit 11, the storage unit 12, and the communication unit 13, respectively. The authentication server 20 is an example of an authentication device. Accordingly, the authentication server 20 as used herein can be read as "authentication device."

The authentication device is a device that executes authentication. The authentication is processing for verifying the validity of a user. The authentication device can execute various types of authentication. For example, the authentication device can execute biometric authentication, possession authentication, knowledge authentication, or a combination thereof. The authentication device may be any device, and is not limited to the authentication server 20 or another server computer. For example, the authentication device may be a personal computer, a tablet terminal, or a smartphone. In addition, for example, the authentication device may be a game machine, a vending machine, a POS terminal, an ATM, or another device.

The user PC 30 is a personal computer of a user. Physical configurations of a control unit 31, a storage unit 32, and a communication unit 33 may be the same as those of the control unit 11, the storage unit 12, and the communication unit 13, respectively. An operating unit 34 is an input device such as a mouse, a keyboard, or a touch panel. A display unit 35 is a liquid crystal display or an organic EL display. A photographing unit 36 includes at least one camera. The user PC 30 is an example of a user device. Accordingly, the user PC 30 as used herein can be read as "user device."

The user device is a device that acquires authentication information at a time of authentication. The user device is a device that can be operated by a user. The user device may be property of the user or may not particularly be property of the user. The user device may be any device, and is not limited to the user PC 30 or another personal computer. For example, the user device may be a tablet terminal, a smartphone, or a wearable terminal. In addition, for example, the user device may be a game machine, a vending machine, a POS terminal, an ATM, or another device.

Programs stored in the storage units 12, 22, and 32 may be supplied via the network N. For example, the programs stored in an information storage medium n supplied through intermediation of at least one of a reading unit (for example, an optical disc drive or a memory card slot) for reading a computer-readable information storage medium, or an input/output unit (for example, a USB port) for inputting and outputting data to/from an external device.

[1-2. Outline of Authentication System According to First Embodiment]

In the authentication system S, multi-factor authentication is executed in order to verify the validity of a user. The multi-factor authentication is authentication that combines a plurality of factors. In the first embodiment, two-factor authentication that combines two factors is taken as an example, but multi-factor authentication that combines three or more factors may be used. As the factor itself, it is possible to use any one of various types, examples of which include a biometric factor, a possession factor, and a knowledge factor.

In the multi-factor authentication, authentication information corresponding to the factor is used. As the authentication information itself, it is possible to use any one of various types. For example, in the biometric authentication, biometric information such as a photograph of a face, a feature amount of the face, a photograph of a fingerprint, a feature amount of a fingerprint, a scanned image of a vein, or a feature amount of a vein corresponds to the authentication information. In the possession authentication, possession information such as a one-time password, information recorded in an IC card, or information recorded in token a corresponds to the authentication information. In the knowledge authentication, knowledge information such as a user ID, a password, a PIN, or a secret question corresponds to the authentication information.

In the first embodiment, a case in which the multi-factor authentication is executed in order to log in to an online service is taken as an example, but the multi-factor authentication can be applied to any situation. For example, the multi-factor authentication can be applied to another situation such as a time of applying for an online service, a time of executing electronic payments, or a time of performing an administrative procedure online. Various services can be applied to the online service itself. For example, a financial service, a communication service, a payment service, an electronic commerce service, or a social networking service (SNS) may correspond to the online service.

For example, when a user registers use of an online service, a user ID and a password for login to the online service are issued. The user uses the user PC 30 to access a website of the online service and input the user ID and the password. The authentication server 20 verifies the validity of the user based on the user ID and the password that have been input by the user. Once the validity of the user is verified, the user can log in to the online service.

It requires considerable time and effort to request a user to input the user ID and the password for every login. Thus, it is conceivable to reduce the time and effort for inputting the user ID by multi-factor authentication that combines face authentication and password authentication. However, even in this case, it still requires time and effort to input the password. When a user is allowed to log in only by face authentication without requiring any input to the operating unit 34, there is a possibility that another user having a similar face may be erroneously authenticated. When the photographing unit 36 includes a 3D sensor, the face authentication can be executed with a certain degree of accuracy, but erroneous recognition may still occur. When the photographing unit 36 does not include a 3D sensor, the probability of erroneous recognition increases. There is another possibility that a third party who has somehow obtained the photograph of the face of a user may impersonate the user.

In view of this, in the first embodiment, in order to ensure security without receiving any input from the operating unit 34, the authentication server 20 issues a temporary user ID when a user logs in to an online service. This temporary user ID is hereinafter referred to as "TUID." The TUID is information that can identify a user. The TUID becomes invalid when a predetermined invalidation condition is satisfied. In the first embodiment, a case in which the login of the user to the online service corresponds to the invalidation condition is taken as an example, but the invalidation condition may be any condition. For example, the invalidation condition may be a condition that a predetermined expiration date has expired, that login has occurred a certain number of times, or that the user has performed a predetermined operation.

The TUID issued by the authentication server 20 is recorded in the user PC 30. In the first embodiment, a case in which the TUID is recorded as a cookie for a browser is described, but the TUID may be recorded as information other than the cookie. The TUID may be displayed on the display unit 35, but is assumed to be hidden from the user in principle. For the second and subsequent times of login, TUID authentication using the TUID is executed together with the face authentication. The TUID authentication is not successful unless the TUID authentication is executed from the user PC 30 on which the TUID is recorded, and hence the TUID authentication is a kind of possession authentication. The multi-factor authentication that combines the face authentication and the TUID authentication is considered to be able to ensure a certain degree of security without receiving any input from the operating unit 34.

However, reuse of the same TUID for a long period of time leads to a possibility that the valid TUID may be stolen by a malicious third party. For example, there is a possibility that a cookie may be stolen by a third party through a replay attack and a TUID included in the cookie may also be stolen. Assuming that a third party obtains not only a TUID but also the photograph of the face of a user in some way, spoofing becomes possible. Thus, it is also conceivable to invalidate the TUID after a certain period of time.

However, when the TUID becomes invalid immediately, a user who logs in infrequently is required to input the user ID and the password every time, thereby reducing convenience of the user. In view of this, in the first embodiment, a salt is used to transform a TUID in order to prevent the TUID from being stolen by a third party while enhancing the convenience of the user. However, when the reuse of the same salt for a long period of time leads to a possibility that the salt itself may be stolen by a malicious third party, and hence salts corresponding to days and time slots of login of the user are set to be used.

Figure 2:
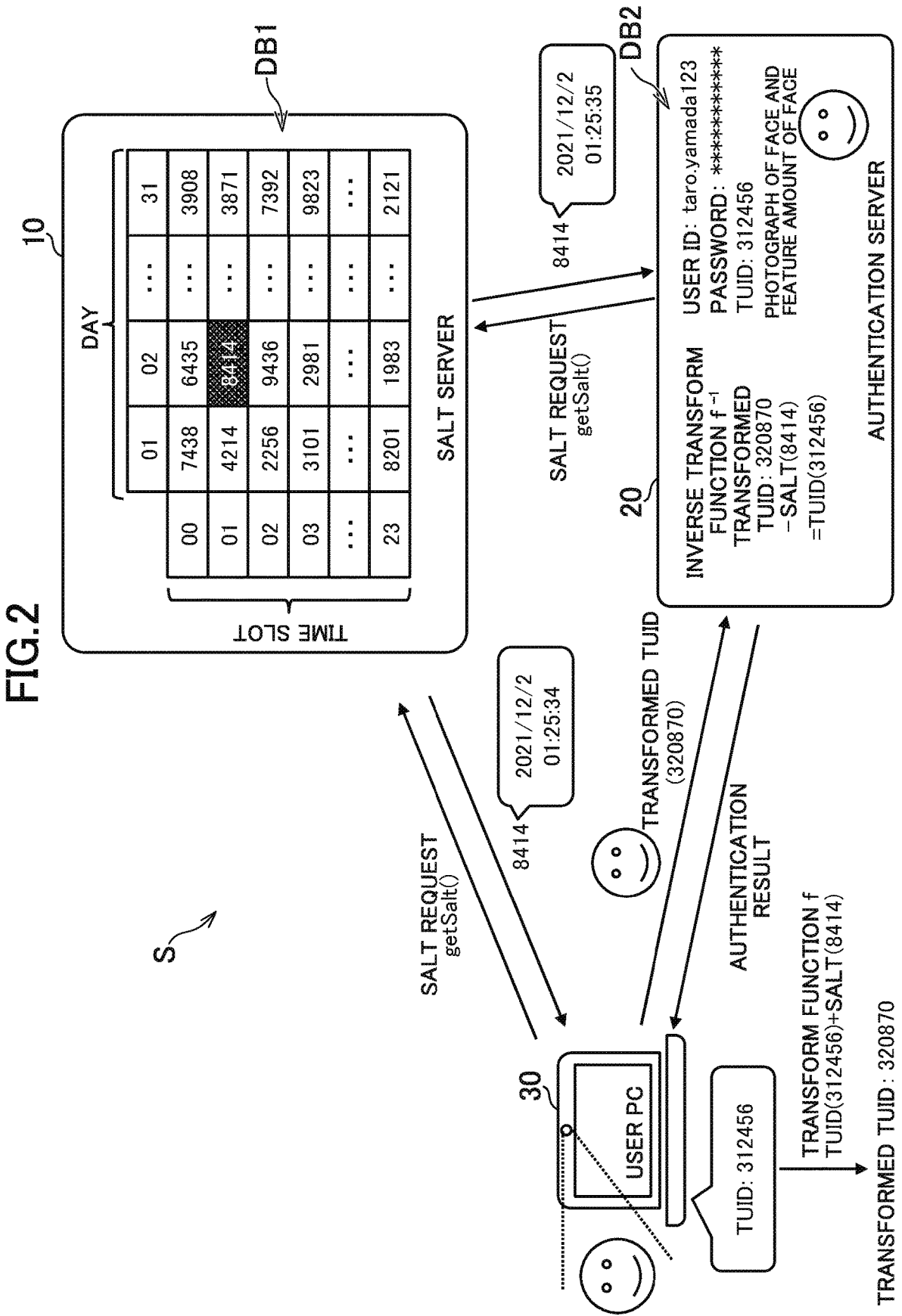
FIG. 2 is a diagram for illustrating an example of a flow of multi-factor authentication in a first embodiment of the present disclosure.

FIG. 2 is a diagram for illustrating an example of a flow of multi-factor authentication in the first embodiment. As illustrated in FIG. 2, when a user is to log in to an online service, the user PC 30 transmits a salt request for acquiring a salt to the salt server 10. In the example of FIG. 2, a command such as getSalt( ) is included in the salt request. This command does not include any salt-related condition, and hence even when a malicious third party steals a glance at the salt request, it is not possible to identify under which condition the salt has been generated.

When the salt server 10 receives a salt request, the salt server 10 refers to a salt database DB1 to acquire a salt corresponding to the current day and time slot. As illustrated in FIG. 2, the salt database DB1 stores a salt for each combination of a day and time slot. For example, assuming that one month has 31 days and 24 hours in a day are divided into hourly time slots, in the example of FIG. 2, $31 \times 24 = 744$ kinds of salts are stored in the salt database DB1. Assuming that the salt server 10 acquires a salt from the salt database DB1 at a time point "01:25:34 on Dec. 2, 2021," the salt server 10 acquires a salt "8414" corresponding to a day "02" and an hour "01" and transmits the salt to the user PC 30.

When the user PC 30 receives the salt "8414" from the salt server 10, the user PC 30 transforms a TUID "312456" based on the salt "8414" and a predetermined transform function "f". In the example of FIG. 2, the transform function "f" is a function that adds the salt "8414" to the TUID "312456". A sum of those, that is, "320870" is obtained as a TUID that has been transformed. The user PC 30 transmits, to the authentication server 20, an authentication request including the photograph of the face of the user generated by the photographing unit 36 and the transformed TUID "320870".

When the authentication server 20 receives the authentication request, the authentication server 20 transmits a salt request to the salt server 10. In the example of FIG. 2, the salt request transmitted from the user PC 30 to the salt server 10 and salt the request transmitted from the authentication server 20 to the salt server 10 have the same format. For this reason, the salt request transmitted from the authentication server 20 to the salt server 10 also includes information such as getSalt( ) from which the condition for a salt cannot be known. The salt requests are set to have a common format, to thereby be able to provide the salt server 10 with a common API as well.

When the salt server 10 receives the salt request from the authentication server 20, the salt server 10 refers to the salt database DB1 to acquire a salt corresponding to the current day and time slot. Assuming that the salt server 10 acquires the salt from a salt database DB1 at a time point "01:25:35 on Dec. 2, 2021," the salt server 10 transmits the salt "8414" corresponding to the day "02" and the hour "01" to the authentication server 20. This salt "8414" is the same as that transmitted to the user PC 30.

When the authentication server 20 receives the salt "8414" from the salt server 10, the authentication server 20 inversely transforms the transformed TUID "320870" received from the user PC based on the salt "8414" and an inverse transform function $f^{-1}$. In the example of FIG. 2, the inverse transform function $f^{-1}$ is a function that subtracts the salt "8414" from the transformed TUID "320870". The authentication server 20 acquires the TUID "312456" by the inverse transformation.

When the authentication server 20 acquires the TUID "312456", the authentication server 20 confirms whether the TUID "312456" is present in a user database DB2. The user database DB2 stores authentication information serving as a correct answer in multi-factor authentication. Processing for confirming the presence or absence of the TUID "312456" corresponds to the TUID authentication. When the TUID "312456" is not stored in the user database DB2, an error occurs at that time point, thereby inhibiting the user from logging in.

When the authentication server 20 confirms that the TUID "312456" is present in the user database DB2, the authentication server 20 acquires the feature amount of the face stored in the user database DB2 in association with the TUID "312456". The authentication server 20 executes the face authentication based on the acquired feature amount of the face and the feature amount of the face calculated from the photograph of the face received from the user PC 30. When the face authentication is successful, the authentication server 20 transmits, to the user PC 30, an authentication result indicating that the multi-factor authentication is successful. When the user PC 30 receives this authentication result, the user PC 30 is brought into a state of having logged in to the online service.

The authentication server 20 may issue a new TUID and store the new TUID in the user database DB2 when the user logs in. That is, the authentication server 20 may update the TUID each time the user logs in. Assuming that the new TUID is "417632", the authentication server 20 is only required to transmit an authentication result including the new TUID "417632" to the user PC 30. The new TUID "417632" may be transformed through use of the salt "8414" that has already been received from the salt server 10. In this case, it is assumed that the authentication server 20 stores a transform function for transforming the new TUID and the user PC 30 stores the inverse transform function $f^{-1}$ for inversely transforming the new TUID that has been transformed. In this inverse transformation as well, the salt "8414" that has already been received from the salt server 10 may be used.

As described above, the authentication system S according to the first embodiment transforms the TUID, and inversely transforms the transformed TUID, based on the salt corresponding to the combination of the day and time slot in which the user logs in. Thus, a TUID is not transmitted over the network N as it is, and hence a third party can no longer easily obtain the TUID. This enhances security in multi-factor authentication. Now, details of the authentication system S according to the first embodiment are described.

[1-3. Functions Implemented by Authentication System According to First Embodiment]

Figure 3:
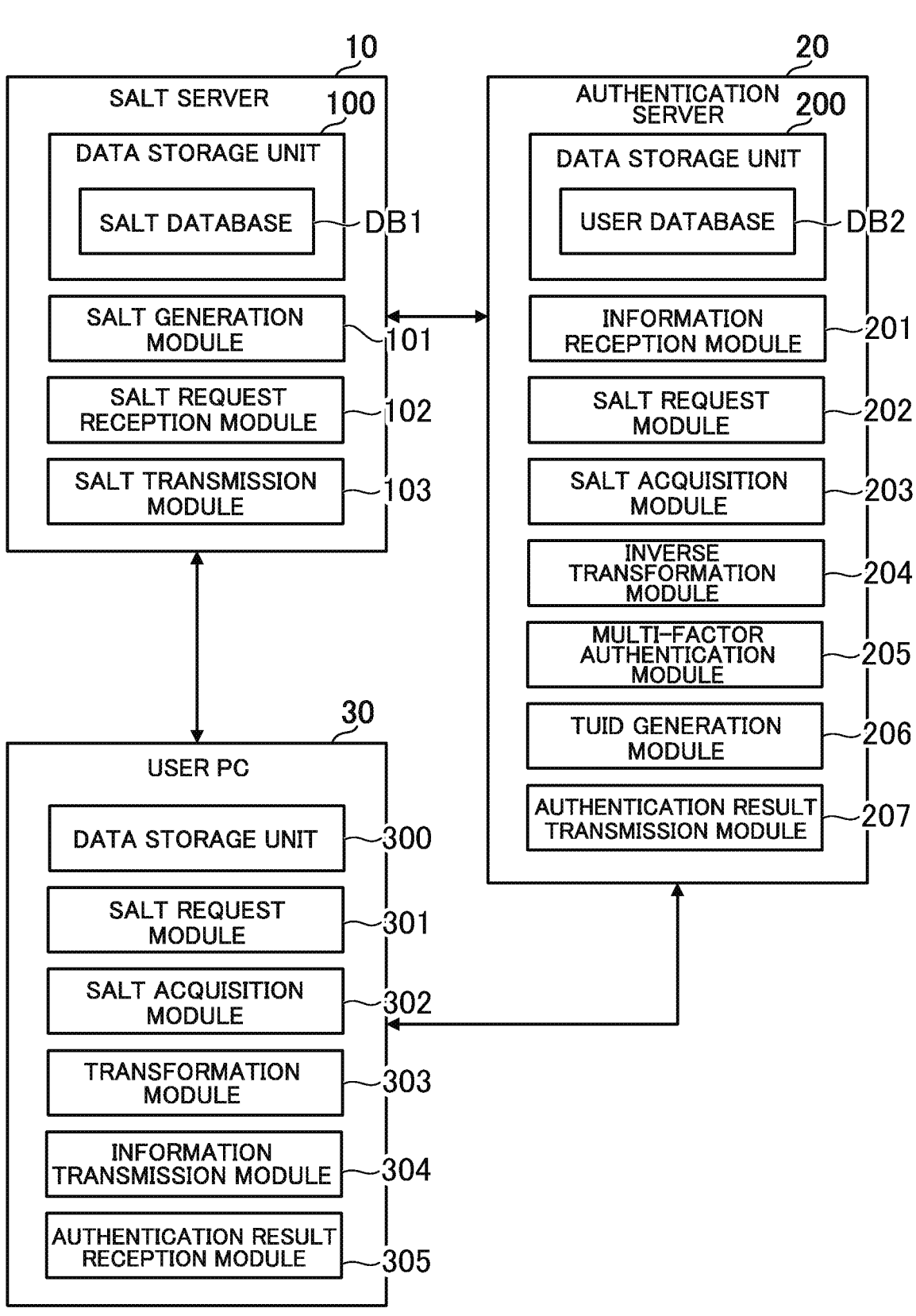
FIG. 3 is a functional block diagram for illustrating an example of functions implemented by an authentication system according to the first embodiment.

FIG. 3 is a functional block diagram for illustrating an example of functions implemented by the authentication system S according to the first embodiment.

[1-3-1. Functions Implemented on Salt Server]

A data storage unit 100 is implemented mainly by the storage unit 12. A salt generation module 101, a salt request reception module 102, and a salt transmission module 103 are implemented mainly by the control unit 11.

[Data Storage Unit]

The data storage unit 100 stores data required for managing salts. For example, the data storage unit 100 stores the salt database DB1.

FIG. 4 is a table for showing an example of the salt database DB1. The salt database DB1 is a database in which salts are stored. For example, the salt database DB1 stores a salt for each combination of a day and time slot. That is, in the salt database DB1, a salt and a combination of a day and time slot are associated with each other. The salts stored in the salt database DB1 may be updated at a timing determined in advance.

In the example of FIG. 4, a case in which salts used at past days and times and salts scheduled to be used at future days and times are stored as well is described, but only the salt to be used at the current day and time may be stored in the salt database DB1. For example, when the current time is "01:25:34 on Dec. 2, 2021," only the salt for the day "02" and the hour "01" may be stored in the salt database DB1. In this case, at "02:00:00 on Dec. 2, 2021," only the salt for the day "02" and an hour "02" is stored in the salt database DB1.

The data storage unit 100 can store any data other than that of the salt database DB1. For example, the data storage unit 100 may store an algorithm for generating a salt. The data storage unit 100 may store data relating to an API for exchanging a salt with the authentication server 20 and the user PC 30. In the first embodiment, a common API is used for the authentication server 20 and the user PC 30 so that salt requests having the same format can be received from the authentication server 20 and the user PC 30, but an API for the authentication server 20 and an API for the user PC 30 may be different from each other.

[Salt Generation Module]

The salt generation module 101 generates a salt based on a predetermined algorithm. For example, the salt generation module 101 generates a salt so that the salt becomes a random value. As a method itself of generating a random value, it is possible to use any one of various publicly known methods. For example, a method using a time stamp at a time of the salt generation may be used, or a method using data other than the time stamp may be used. The salt generation module 101 stores the generated salt in the salt database DB1.

In the first embodiment, the salt generation module 101 generates a salt for each combination of a future day and time slot. The salt generation module 101 stores this combination and the generated salt in the salt database DB1 in association with each other. The salt generation module 101 may update the salts stored in the salt database DB1 at a predetermined timing. This timing may be any timing, for example, the first day of a certain month, the first day of a certain week, or the beginning of a day.

In the first embodiment, a case in which the same salt is the transformation of the TUID and the inverse used for transformation of the transformed TUID is taken as an example. Thus, the salt is an example of transformation information and is also an example of inverse transformation information. The salt as used herein can be read as "transformation information." The salt as used herein can also be read as "inverse transformation information." The transformation information is an encryption key in cryptography. The inverse transformation information is a decryption key in cryptography. In the first embodiment, the transformation information and the inverse transformation information are the same, and hence the transformation information and the inverse transformation information each correspond to a common key in cryptography.

The transformation information and the inverse transformation information may be different from each other. For example, the transformation information may be a public key in cryptography, and the inverse transformation information may be a secret key in cryptography. In contrast, the transformation information may be a secret key in cryptography, and the inverse transformation information may be a public key in cryptography. When the transformation information the inverse and transformation information are different from each other, both the transformation information and the inverse transformation information are stored in the salt database DB1. Of both of those, the transformation information is transmitted to the user PC 30, and the inverse transformation information is transmitted to the authentication server 20. As in the first embodiment, when the transformation information and the inverse transformation information are set to correspond to the combination of the day and time slot, the salt database DB1 stores a combination of the transformation information and the inverse transformation information for each combination of the day and time slot.

[Salt Request Reception Module]

The salt request reception module 102 receives a salt request from each of the authentication server 20 and the user PC 30. A salt request is information having a predetermined format to be transmitted to request a salt. In FIG. 2, the salt request including a command such as getSalt( ) is illustrated as an example, but the salt request may be any information indicating that a salt has been requested. In the first embodiment, a case in which the salt request received from the authentication server 20 and the salt request received from the user PC 30 have the same format is described, but the formats of those may be different from each other.

[Salt Transmission Module]

The salt transmission module 103 transmits a salt to each of the authentication server 20 and the user PC 30. In the first embodiment, the salt transmission module 103 transmits, to each of the authentication server 20 and the user PC 30, a salt corresponding to a day and time slot to which a salt acquisition time point being a time point at which a salt is acquired belongs. The salt acquisition time point may be any time point between when a salt request is received and when a salt is transmitted. The salt transmission module 103 refers to the salt database DB1 to identify a combination of a day and time slot to which the salt acquisition time point belongs. The salt transmission module 103 transmits a salt associated with the identified combination to each of the authentication server 20 and the user PC 30.

Only one salt transmission module 103 is illustrated in FIG. 3, but the transmission of a salt to the user PC 30 and the transmission of a salt to the authentication server 20 can be regarded as separate functions. Thus, the salt transmission module 103 can be regarded as including a first salt transmission module 103A that transmits a salt to the user PC 30 when a salt request is received from the user PC 30 and a second salt transmission module 103B that transmits a salt to the authentication server 20 when a salt request is received from the authentication server 20. When a procedure for transmitting a salt to the user PC 30 and a procedure for transmitting a salt to the authentication server 20 are different, the first salt transmission module 103A may transmit a salt to the user PC 30 in accordance with the procedure for transmitting a salt to the user PC 30. The second salt transmission module 103B may transmit a salt to the authentication server 20 in accordance with the procedure for transmitting a salt to the authentication

[1-3-2. Functions Implemented on Authentication Server]

A data storage unit 200 is implemented mainly by the storage unit 22. An information reception module 201, a salt request module 202, a salt acquisition module 203, an inverse transformation module 204, a multi-factor authentication module 205, a TUID generation module 206, and an authentication result transmission module 207 are implemented.

[Data Storage Unit]

The data storage unit 200 stores data required for multi-factor authentication. For example, the data storage unit 200 stores the user database DB2.

FIG. 5 is a table for showing an example of the user database DB2. The user database DB2 is a database in which pieces of information on the user are stored. For example, the user database DB2 stores a user ID, a password, a full name, a TUID, the photograph of a face, and the feature amount of the face. The information stored in the user database DB2 may be of any type, and is not limited to the example of FIG. 5. For example, a session ID for maintaining a session with the user PC 30, a past login history of a user, or an online service usage history of the user may be stored in the user database DB2.

The photograph of a face is an example of biometric information. The TUID is an example of the authentication information different from biometric information. Accordingly, the photograph of the face as used herein can be read as "biometric information." The TUID as used herein can be read as "authentication information different from biometric information." Any combination of the biometric information and the authentication information different from biometric information may be used. This combination is the combination of factors in multi-factor authentication.

The biometric information is information to be used in biometric authentication. As the biometric information itself, any one of various types of information may be used, and for example, the feature amount of a face may correspond to the biometric information. Information called "template" obtained by transforming the feature amount of the face may correspond to the biometric information. When biometric authentication other than the face authentication is used, biometric information corresponding to biometric authentication may be used. Examples of other biometric information are as described above. The authentication information different from biometric information is information to be used in multi-factor authentication together with biometric information. This authentication information is the possession information or the knowledge information. In a case of multi-factor authentication using three or more factors, there may be a plurality of pieces of authentication information different from biometric information.

The data storage unit 200 can store any data other than the user database DB2. For example, the data storage unit 200 may store the inverse transform function $f^{-1}$. For example, the data storage unit 200 may store an algorithm for generating a TUID.

[Information Reception Module]

The information reception module 201 receives a transformed TUID and the photograph of a face from the user PC 30. Receiving the photograph of the face refers to receiving image data on an image in which a face has been photographed. The photograph of the face may be a still image, or may be an individual frame included in a moving image. In the first embodiment, a case in which the transformed TUID and the photograph of the face are included in the authentication request is taken as an example. Thus, the information reception module 201 receives the transformed TUID and the photograph of the face by receiving the authentication request from the user PC 30. The authentication request is a request for executing multi-factor authentication. The authentication request may be issued by transmitting information having a predetermined format. The authentication request may also include other information. For example, the authentication request may include information that can identify the user PC 30, such as the IP address of the user PC 30.

[Salt Request Module]

The salt request module 202 requests a salt from the salt server 10. The salt request for requesting a salt is as described above. In the first embodiment, the salt request module 202 transmits, to the salt server 10, a salt request that does not include information relating to an acquisition rule for a salt. For example, in a case of acquiring a salt corresponding to a combination of a day and time slot, the acquisition rule is the combination of the day and time slot. The salt request does not include the combination of the day and time slot, and thus does not include the information relating to the acquisition rule.

The fact that the information relating to the acquisition rule is not included in the salt request is the same when another acquisition rule is employed. For example, when a salt different for each day is used without the time slot being taken into consideration, the acquisition rule is only a day. The salt request does not include information relating to a day, and thus does not include the information relating to the acquisition rule. For example, when a salt different for each time slot is used without the day being taken into consideration, the acquisition rule is only a time slot. The salt request does not include information relating to a time slot, and thus does not include the information relating to the acquisition rule.

The salt request may include the acquisition rule for a salt. For example, information to be a seed for generating a salt may be included in the salt request. In this case, the same salt is not to be obtained unless the same seed is used, and hence it is assumed that the authentication server 20 and the user PC 30 share a seed used for generating the salt. For example, as in a second embodiment of the present disclosure described later, a part of the acquisition rule for a salt (in the second embodiment, last two digits of a TUID) may be included in the salt request.

[Salt Acquisition Module]

The salt acquisition module 203 acquires a salt for inversely transforming the transformed TUID. This salt is an example of the inverse transformation information. The salt acquisition module 203 is an example of an inverse transformation information acquisition module. Accordingly, the salt acquisition module 203 as used herein can be read as "inverse transformation information acquisition module." The inverse transformation information acquisition module acquires inverse transformation information, for example, a salt. When the inverse transformation information is called by a name other than "salt," the inverse transformation information acquisition module may be called by a name corresponding to this name. For example, when the inverse transformation information is called "key," the inverse transformation information acquisition module acquires a key.

In the first embodiment, the salt server 10 manages salts, and hence the salt acquisition module 203 acquires a salt from the salt server 10. The salts may be managed by the authentication server 20 itself. That is, the authentication server 20 may correspond to the management device. In this case, the data storage unit 200 stores the salt database DB1. In addition, in this case, the salt generation module 101, the salt request reception module 102, and the salt transmission module 103, which have been described as being implemented by the salt server 10, are implemented by the authentication server 20.

In the first embodiment, the salt acquisition module 203 acquires the salt corresponding to the combination of the day and time slot. The combination of the day and time slot is an example of a first acquisition period. Accordingly, the combination of the day and time slot as used herein can be read as "first acquisition period." The first acquisition period is a period to which a first acquisition time point at which the salt is acquired belongs. In the first embodiment, a case in which the first acquisition period is represented by a combination of a day and time slot is taken as an example, but the first acquisition period may mean only a day, or may mean only a time slot.

The method of dividing the first acquisition period is not limited to such hourly basis division as described in the first embodiment. Each individual period may have a length longer or shorter than one hour. The length of one period may be different from the length of another period. Even when the first acquisition period has a meaning other than the combination of the day and time slot, the salt acquisition module 203 is only required to acquire the salt corresponding to the first acquisition period. It is assumed that the relationship between each individual period and the salt is stored in the salt database DB1. It suffices that the salt acquisition module 203 acquires the salt corresponding to the first acquisition period.

[Inverse Transformation Module]

The inverse transformation module 204 inversely transforms the transformed TUID based on the salt acquired by the salt acquisition module 203. The inverse transformation is decryption in cryptography. It is assumed that the inverse transform function $f^{-1}$ for the inverse transformation is stored in the data storage unit 200. The inverse transformation module 204 uses the inverse transform function $f^{-1}$ to inversely transform the transformed TUID based on the salt, which is an example of the inverse transformation information. In the example of FIG. 2, the inverse transformation module 204 inversely transforms the transformed TUID by subtracting the salt from the transformed TUID to acquire the TUID.

The inverse transformation itself can use various inverse transform functions $f^{-1}$, and is not limited to the subtraction indicated in FIG. 2. The inverse transformation may be performed by, for example, addition, multiplication, division, matrix transformation, another calculation, or a combination thereof. In the example of FIG. 2, for simplification of the description, it is assumed that the transform function f and the inverse transform function $f^{-1}$ are a simple addition and a simple subtraction, respectively, but may be complicated calculation formulae to some extent in an actual case.

[Multi-Factor Authentication Module]

The multi-factor authentication module 205 executes multi-factor authentication based on the TUID inversely transformed by the inverse transformation module 204 and the photograph of the face received by the information reception module 201. As described above, as the multi-factor authentication itself, any one of various types can be used. In the first embodiment, the multi-factor authentication module 205 refers to the user database DB2 to acquire the feature amount of the face associated with the TUID inversely transformed by the inverse transformation module 204. This feature amount of the face is authentication information to be used as a correct answer in multi-factor authentication. Of the feature amounts of the faces stored in the user database DB2, only the feature amounts of the faces associated with the TUID inversely transformed by the inverse transformation module 204 are subjected to comparison. Other feature amounts of the faces are not subjected to comparison.

The multi-factor authentication module 205 calculates the feature amount of the face based on the photograph of the face received by the information reception module 201. As a method itself of calculating the feature amount of the face, any one of various calculation methods can be used. For example, the feature amount of the face may be calculated by a calculation method using a contrast filter or principal component analysis. The feature amount of the face can be expressed in any format such as a multidimensional vector, an array, or a single numerical value. The face authentication may be of a type in which two photographs of the faces are input to a machine learning model to determine similarity or dissimilarity instead of a type in which the feature amounts of the faces are compared to each other.

The multi-factor authentication module 205 determines the similarity or dissimilarity between the feature amount of the face acquired from the user database DB2 and the feature amount of the face calculated from the photograph of the face received by the information reception module 201. For example, when the feature amounts of the faces are expressed by multidimensional vectors, a distance between the feature amounts of the faces in a vector space being smaller than a threshold value corresponds to the feature amounts being similar to each other. The multi-factor authentication module 205 determines that the multi-factor authentication is successful when the feature amounts of the faces are similar to each other. The multi-factor authentication module 205 determines that the multi-factor authentication has failed when the feature amounts of the faces are not similar to each other.

[TUID Generation Module]

The TUID generation module 206 generates a TUID based on a predetermined algorithm. The TUID generation module 206 generates a TUID to be newly recorded for the user PC 30 when there is no TUID on the user PC 30. Under a state in which there is a TUID on the user PC 30, in place of this TUID, the TUID generation module 206 generates a TUID (updated TUID) to be written to the user PC 30.

For example, the TUID generation module 206 generates a TUID so that the TUID becomes a random value. As a method itself of generating a random value, any one of various publicly known methods can be used. For example, a method using a time stamp at the time of generating a TUID may be used, or a method using data other than the time stamp may be used. The TUID generation module 206 stores the generated TUID in the user database DB2.

The TUID generation module 206 may generate a TUID so as to avoid duplicating the TUID of another user. The TUID generation module 206 may generate a TUID so as to avoid duplicating the TUID of another user whose face is similar while permitting duplication with the TUID of another user whose face is not similar. The TUID generation module 206 may generate a TUID when the multi-factor authentication is successful. That is, the TUID generation module 206 may generate a TUID each time the user logs in to the online service. When the login is performed for the first time, the TUID generation module 206 generates a TUID when the authentication of the user ID and password is successful.

A timing at which a TUID is generated may be any timing, and is not limited to the example of the first embodiment. For example, instead of invalidating the TUID based on login performed only once, in order to validate the same TUID a predetermined number of times equal to or more than two times, the TUID generation module 206 may generate a TUID each time login occurs the predetermined number of times. For example, when the TUID is provided with an expiration date, the TUID generation module 206 may generate the TUID when the user logs in at a time nearing the expiration date.

[Authentication Result Transmission Module]

The authentication result transmission module 207 transmits an authentication result of the multi-factor authentication to the user PC 30. The authentication result is information having a predetermined format that indicates whether or not the multi-factor authentication is successful. For example, the authentication result indicates whether or not login has been permitted. In the first embodiment, a new TUID is generated at a timing of login, and hence the authentication result includes the TUID generated by the TUID.

When the multi-factor authentication is successful, execution of predetermined processing is permitted. In the first embodiment, login to an online service is described as an example of this processing, but this processing may be any processing that is permitted on condition that the multi-factor authentication is successful. This processing may be determined based on a situation in which the authentication system S is applied. For example, when the authentication system S is applied to a financial service, execution of a transfer may correspond to the predetermined processing. For example, when the authentication system S is applied to a payment service, execution of payment may correspond to the predetermined processing. For example, when the authentication system S is applied to an electronic commerce service, purchasing a product may correspond to the predetermined processing. The predetermined processing may be any other processing.

[1-3-3. Functions Implemented on User PC]

A data storage unit 300 is implemented mainly by the storage unit 32. A salt request module 301, a salt acquisition 302, module a transformation module 303, an information transmission module 304, and an authentication result reception module 305 are implemented mainly by the control unit 31.

[Data Storage Unit]

The data storage unit 300 stores data required for multi-factor authentication. For example, the data storage unit 300 stores a TUID and a transform function "f". When the photographing unit 36 is not used for generating the photograph of the face of the user, the data storage unit 300 may store the image data on the photograph of the face of the user. For example, when an application for an online service is provided, the data storage unit 300 may store this application.

[Salt Request Module]

The salt request module 301 requests a salt from the salt server 10. The salt request for requesting a salt is as described above. In the first embodiment, the salt request module 301 transmits, to the salt server 10, a salt request that does not include information relating to an acquisition rule for a salt. This point is the same with the salt request module 202 of the authentication server 20. Other points relating to the salt request are also as described in the processing of the salt request module 202.

In the first embodiment, the salt request module 301 requests the salt server 10 for a salt when the photographing unit 36 generates a photograph of the face. The salt request module 301 may request a salt at any timing, which is not limited to the timing at which the photograph of the face is generated. For example, the salt request module 301 may request a salt at a timing at which the application for the online service is activated, at a timing at which the user performs an operation for login, or at a timing at which the website of the online service is accessed.

[Salt Acquisition Module]

The salt acquisition module 302 acquires a salt for transforming the TUID, which is different from the photograph of a face. In the first embodiment, the acquisition of a salt from the salt server 10 to the user PC 30 and the acquisition of a salt from the salt server 10 to the authentication server 20 are performed by the same procedure, and hence the processing of the salt request module 301 is the same as that of the salt request module 202 of the authentication server 20. For this reason, the same applies to points that a salt is acquired from the salt server 10, that the salt corresponding to the first acquisition period to which the first acquisition time point at which the salt is acquired belongs is acquired, and that the salt corresponding to the combination of the day and time slot is acquired.

[Transformation Module]

The transformation module 303 transforms the TUID based on the salt. The transformation is encryption in cryptography. It suffices that the transformation involves changing the TUID in some way. For example, inputting the TUID into some function, changing a part of the TUID, changing the entire TUID, adding some information to the TUID, or deleting a part of the TUID corresponds to the transformation. The inverse transformation may be any processing in a reverse direction thereto (processing for restoring the original TUID).

The transform function "f" for the transformation is assumed to be stored in the data storage unit 300. The transformation module 303 uses the transform function "f" to transform the TUID that has not been transformed based on the salt, which is an example of the transformation information. In the example of FIG. 2, the transformation module 303 transforms the TUID that has not been transformed by adding the salt to the TUID that has not been transformed, to thereby acquire the transformed TUID. The transformation itself can use any one of various transform functions, and is not limited to the addition indicated in FIG. 2. The transformations may be performed by, for example, subtraction, multiplication, division, matrix transformation, another calculation, or a combination thereof.

[Information Transmission Module]

The information transmission module 304 transmits the transformed TUID and the photograph of the face to the authentication server 20. In the first embodiment, a case in which the transformed TUID and the photograph of the face are included in the authentication request is taken as an example. Thus, the information transmission module 304 transmits the transformed TUID and the photograph of the face by transmitting the authentication request including the transformed TUID and the photograph of the face to the authentication server 20. The information transmission module 304 is not required to transmit the transformed TUID and the photograph of the face collectively as one piece of data. The information transmission module 304 may transmit the transformed TUID and the photograph of the face separately. Instead of being transmitted as it is, the photograph of the face may also be transformed based on a salt or another encryption key. The feature amount of the face may be calculated on the user PC 30 side, and the calculated feature amount of the face may be transmitted as the biometric information.

[Authentication Result Reception Module]

The authentication result reception module 305 receives the authentication result from the authentication server 20. When this authentication result indicates success, the user logs in to the online service. That is, the execution of the predetermined processing described above is permitted. When a new TUID is included in the authentication result, the authentication result reception module 305 records the TUID included in the authentication result in the data storage unit 300. The old TUID recorded so far is discarded from the data storage unit 300.

[1-4. Processing to be Executed by Authentication System According to First Embodiment]

Figure 6:
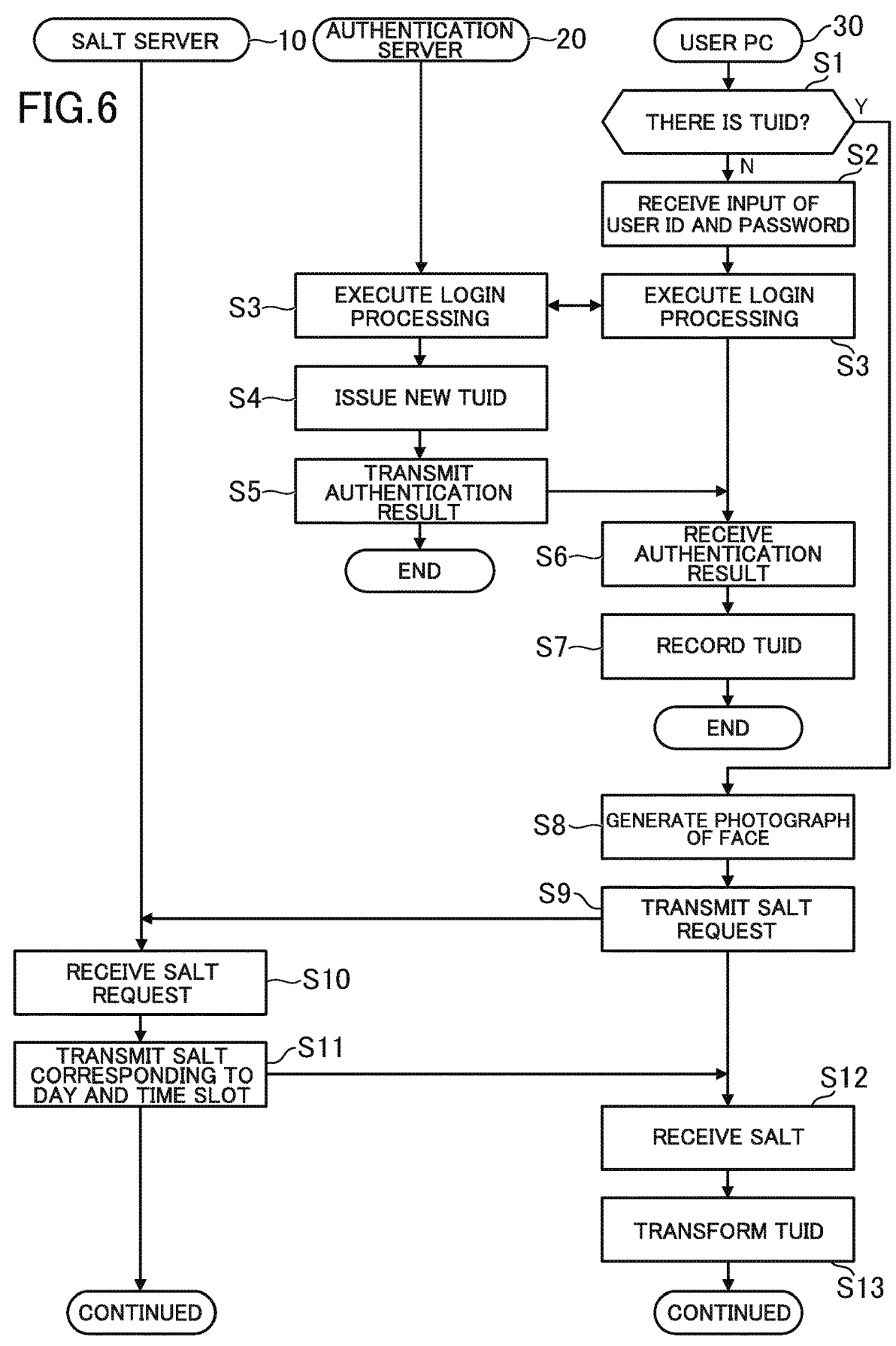
FIG. 6 is a diagram for illustrating an example of processing to be executed by the authentication system according to the first embodiment.
Figure 7:
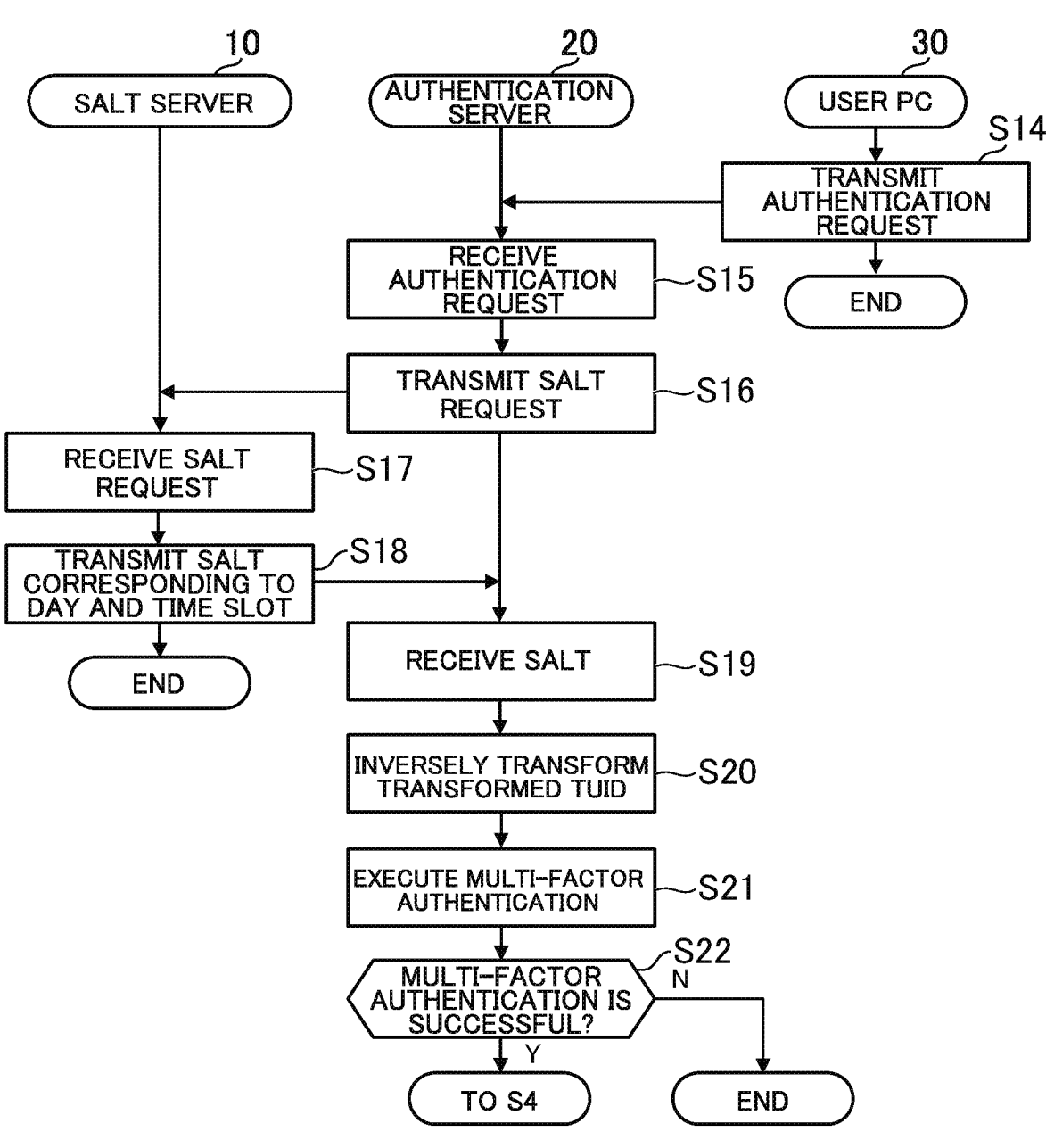
FIG. 7 is a diagram for illustrating an example of the processing to be executed by the authentication system according to the first embodiment.

FIG. 6 and FIG. 7 are diagrams for illustrating an example of processing to be executed by the authentication system S according to the first embodiment. The control units 11, 21, and 31 execute programs stored in the storage units 12, 22, and 32, respectively, to thereby execute the processing of FIG. 6 and FIG. 7. It is assumed that the user ID and password of the user have already been issued for the execution of the processing of FIG. 6 and FIG. 7. It is also assumed that the salt has already been stored in the salt database DB1.

As illustrated in FIG. 6, the user PC 30 activates an application of an online service, and determines whether or not there is a TUID in the storage unit 32 (Step S1). When it is determined that there is no TUID (N in Step S1), the user PC 30 receives the input of a user ID and password by the user based on a detection signal obtained by the operating unit 34 (Step S2). Login processing for logging in to the online service is executed between the authentication server 20 and the user PC 30 (Step S3). In Step S3, the validity of the user ID and password is verified based on the user database DB2. When the login is successful, the authentication server 20 issues a new TUID (Step S4), and transmits an authentication result including the new TUID to the user PC 30 (Step S5).

When the user PC 30 receives the authentication result (Step S6), the user PC 30 records the TUID included in the authentication result in the storage unit 32 (Step S7), and this processing ends. In Step S7, the TUID may be recorded as a part of a cookie. After that, the user PC 30 executes processing for allowing the user to use the online service. When the user performs an operation for logging out of the online service, logout processing for logging out of the online service is executed between the authentication server 20 and the user PC 30.

When it is determined in Step S1 that there is a TUID (Y in Step S1), the user PC 30 photographs the face of the user based on the photographing unit 36 to generate a photograph of the face (Step S8). The user PC 30 transmits a salt request to the salt server 10 (Step S9). When the salt server 10 receives the salt request (Step S10), the salt server 10 transmits, to the user PC 30, the salt corresponding to the current day and time slot based on the salt database DB1 (Step S11). When the user PC 30 receives the salt from the salt server 10 (Step S12), the user PC 30 transforms the TUID stored in the storage unit 32 based on this salt (Step S13).

Referring now to FIG. 7, the user PC 30 transmits, to the authentication server 20, an authentication request including the TUID transformed in Step S13 and the photograph of the face generated in Step S8 (Step S14). When the authentication server 20 receives the authentication request (Step S15), the authentication server 20 transmits a salt request to the salt server 10 (Step S16). When the salt server 10 receives the salt request (Step S17), the salt server 10 transmits, to the authentication server 20, the salt corresponding to the current day and time slot based on the salt database DB1 (Step S18).

When the authentication server 20 receives the salt from the salt server 10 (Step S19), the authentication server 20 inversely transforms the transformed TUID included in the authentication request received in Step S15 based on this salt (Step S20). The authentication server 20 executes multi-factor authentication based on the TUID inversely transformed in Step S20 and the photograph of the face included in the authentication request received in Step S15 (Step S21). In Step S21, the authentication server 20 acquires the feature amount of the face associated with the TUID inversely transformed in Step S20 based on the user database DB2. The authentication server 20 calculates the feature amount of the face based on the photograph of the face received in Step S15. The authentication server 20 determines whether or not a degree of similarity between the acquired feature amounts of the faces is equal to or larger than a threshold value. When the TUID is present in the user database DB2 and the degree of similarity between the feature amounts of the faces is equal to or larger than the threshold value, the multi-factor authentication is successful.

The authentication server 20 determines whether or not the multi-factor authentication is successful (Step S22). When the multi-factor authentication fails (N in Step S22), this processing ends. In this case, the input of the user ID and password may be requested. When the multi-factor authentication is successful (Y in Step S22), the user is permitted to log in to the online service, and the process advances to the processing step of Step S4. The TUID of the user PC 30 is updated in the processing step of Step S4 and the subsequent steps.

According to the authentication system S of the first embodiment, the user PC 30 transforms a TUID based on a salt for transforming the TUID, which is different from the photograph of a face, and transmits the transformed TUID and the photograph of the face to the authentication server 20. The authentication server 20 inversely transforms the transformed TUID based on the salt for inversely transforming the transformed TUID, and executes multi-factor authentication based on the inversely transformed TUID and the photograph of the face. Accordingly, the TUID is not acquired by a third party due to the transformed TUID being transmitted over a network, thereby enhancing security in multi-factor authentication.

Further, the authentication system S acquires a salt corresponding to the first acquisition period to which the first acquisition time point at which the salt is acquired belongs. Thus, it is possible to place a limit on a period during which the salt is effective. Even when the salt is acquired by a third party, the period during which this salt can be used is limited, thereby enhancing security in multi-factor authentication.

Further, the authentication system S acquires a salt corresponding to a combination of a day and time slot. Thus, the period during which the salt is effective can be set in units of time slots, and hence the period during which the salt is effective can be set relatively short. Even when the salt is acquired by a third party, the period during which this salt can be used is short, thereby effectively enhancing security in multi-factor authentication.

Further, the authentication system S includes the salt server 10 that manages salts, and the salt server 10 transmits the salt to the authentication server 20 and the user PC 30. Thus, the authentication server 20 is not required to manage salts, to thereby be able to distribute processing loads in multi-factor authentication. That is, the processing required for multi-factor authentication can be distributed between the salt server 10 and the authentication server 20. Accordingly, it is possible to reduce a processing load on the authentication server 20.

Further, the authentication system S transmits a request that does not include information relating to the acquisition rule for a salt to the salt server 10. Thus, even when a malicious third party steals the salt request, it is difficult to decipher a mechanism for the transformation of a TUID. For example, even when a salt corresponding to a day and time slot has been acquired, the acquisition rule cannot be grasped based only on the salt request, thereby further enhancing security in multi-factor authentication.

2. Second Embodiment

In the first embodiment, the case in which the salt corresponding to the day and time slot is used has been described. A method of acquiring the salt is not limited to the example of the first embodiment. In the second embodiment, a case in which a salt corresponding to a combination of a day on which the salt is acquired and a part of the TUID is used is described. In the following second to sixth embodiments of the present disclosure, description of the same points as in the first embodiment is omitted.

Figure 8:
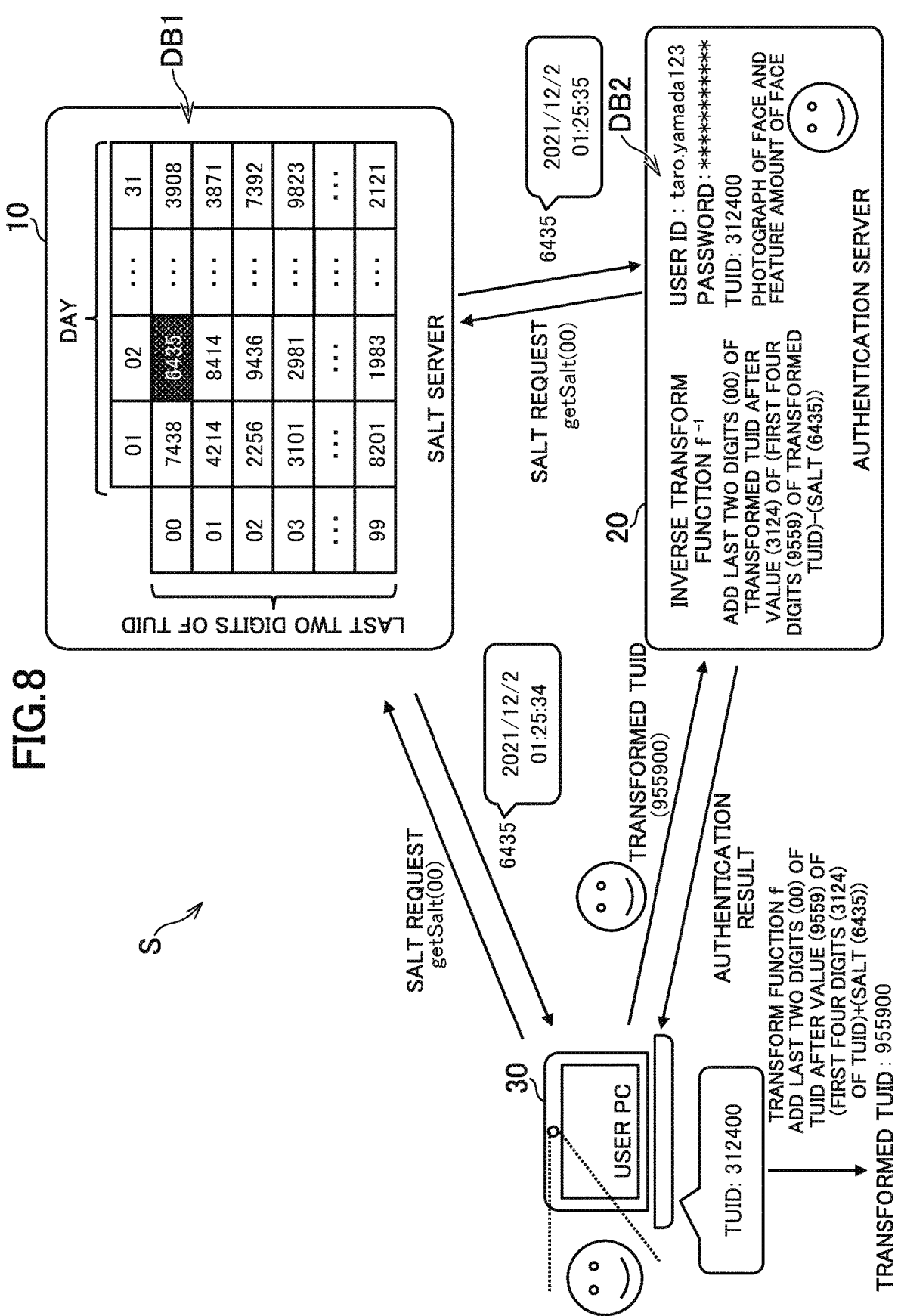
FIG. 8 is a diagram for illustrating an example of a flow of multi-factor authentication in a second embodiment of the present disclosure.

FIG. 8 is a diagram for illustrating an example of a flow of multi-factor authentication in the second embodiment. As illustrated in FIG. 8, a general flow is the same as that of the first embodiment, but the method of acquiring the salt is different from that of the first embodiment. For example, the salt database DB1 stores a salt for each combination of a day and last two digits of a TUID. The user PC 30 transmits a salt request including last two digits "00" of a TUID "312400" to the salt server 10. Even when a malicious third party steals the last two digits of a TUID, the malicious third party cannot steal the TUID itself and cannot grasp the acquisition rule for a salt based only on the numerical value "00".

When the salt server 10 receives the salt request, the salt server 10 refers to the salt database DB1 to acquire a salt corresponding to the combination of the current day and last two digits of the TUID included in the salt request. In the example of FIG. 8, the salt server 10 transmits, to the user PC 30, a salt "6435" corresponding to the day "02" on which the salt request is received from the user PC 30 and the last two digits "00" of the TUID.

When the user PC 30 receives the salt "6435" from the salt server 10, the user PC 30 transforms the TUID "312400" based on this salt "6435". In the example of FIG. 8, a transform function "f" for adding the last two digits "00" of the TUID after "9559" obtained by adding the salt "6435" to first four digits "3124" of the TUID is used to obtain "955900" as the transformed TUID. The user PC 30 transmits, to the authentication server 20, an authentication request including the photograph of the face of the user generated by the photographing unit 36 and the transformed TUID "955900".

When the authentication server 20 receives the authentication request, the authentication server 20 transmits, to the salt server 10, a salt request including the last two digits "00" of the transformed TUID "955900". When the salt server 10 receives the salt request, the salt server 10 refers to the salt database DB1 to transmit, to the authentication server 20, the salt "6435" corresponding to the combination of the current day "02" and the last two digits "00" of the TUID included in the salt request.

When the authentication server 20 receives the salt "6435" from the salt server 10, the authentication server 20 inversely transforms the transformed TUID "955900" received from the user PC based on this salt "6435". In the example of FIG. 8, a transform function $f^{-1}$ for adding the last two digits "00" of the transformed TUID after the value obtained by subtracting the salt "6435" from first four digits "9559" of the transformed TUID "955900" is used. The authentication server 20 acquires the first four digits "3124" of the TUID by the inverse transformation. The authentication server 20 adds the last two digits "00" of the TUID to the first four digits "3124" of the TUID to acquire the TUID "312400". The subsequent flow of the multi-factor authentication is the same as in the first embodiment.

The functional blocks of the second embodiment are the same as those of the first embodiment. The salt acquisition modules 203 and 302 each acquire the salt corresponding to the last two digits of the TUID. The last two digits of the TUID are an example of the part of the TUID. Thus, the last two digits of the TUID as used herein can be read as "part of the TUID." The part of the TUID may be any part, and is not limited to the last two digits of the TUID. For example, the part of the TUID may be the first digit of the TUID, or may be any one of the second to fourth digits of the TUID. The part of the TUID is not required to be consecutive digits, and, for example, may be the first and last digits of the TUID. The length of the part of the TUID may also be any length.

In the second embodiment, a case in which the salt acquisition modules 203 and 302 each acquire the salt corresponding to the combination of the day on which the salt is acquired and the last two digits of the TUID is described, but the salt acquisition modules 203 and 302 may each acquire a salt corresponding to the last two digits of the TUID irrespective of the day. In this case, it is assumed that a salt is defined for each candidate of the last two digits of the TUID in the salt database DB1. In addition, for example, the salt acquisition modules 203 and 302 may each acquire a salt corresponding to a combination of a time slot in which the salt is acquired and the last two digits of the TUID irrespective of the day. In this case, it is assumed that a salt is defined for each combination of those factors in the salt database DB1. Through combination of the first embodiment and the second embodiment, the salt acquisition modules 203 and 302 may each acquire a salt corresponding to a combination of three factors, such as the day, the time slot, and the last two digits of the TUID. In this case, it is assumed that a salt is defined for each combination of those three factors in the salt database DB1.

The information transmission module 304 further transmits, to the authentication server 20, the last two digits of the TUID that has not been transformed by the transformation module 303. Those last two digits correspond to plaintext in cryptography. In the second embodiment, a case in which those last two digits are included as the last two digits of the transformed TUID is described, but those last two digits may be transmitted as information separate from the transformed TUID. Even in a case of transmitting the transformed TUID by including those last two digits therein, those last two digits may be added to a position (for example, first two digits) different from the original position (last two digits). Those last two digits are an example of an untransformed part. Thus, those last two digits as used herein can be read as "untransformed part." As described above, this part is not limited to the last two digits.

The information reception module 201 further receives the last two digits of the untransformed TUID from the user PC 30. In the second embodiment, the last two digits of the untransformed TUID are included as the part of the transformed TUID, and hence the information reception module 201 receives the last two digits of the untransformed TUID by receiving the transformed TUID. When the last two digits of the untransformed TUID are transmitted as information different from the transformed TUID, the information reception module 201 may receive the last two digits of the untransformed TUID transmitted as the different information. The salt acquisition module 203 acquires the salt corresponding to the last two digits of the untransformed TUID. The method of acquiring the salt performed by the salt acquisition module 203 is the same as the method of acquiring the salt performed by the salt acquisition module 302.

According to the authentication system S of the second embodiment, the user PC 30 acquires a salt corresponding to the last two digits of a TUID, and transmits the last two digits of the untransformed TUID. The authentication server 20 receives the last two digits of the untransformed TUID from the user PC 30, and acquires the salt corresponding to the last two digits of the untransformed TUID. Accordingly, the transformed TUID is transmitted over a network, and hence it becomes difficult for a third party to acquire the TUID, thereby enhancing security in multi-factor authentication. Even when a malicious third party steals the salt request, it is difficult to grasp the mechanism for the transformation based only on the last two digits of the TUID, thereby further enhancing security in multi-factor authentication.

3. Third Embodiment

The method of acquiring the salt is not limited to the examples of the first embodiment and the second embodiment. In the third embodiment, a case in which such a temporal condition as the day or time slot is not used to acquire a salt is described. In the third embodiment, the salt server 10 generates a pair of salts, and the generated pair is used to execute the transformation and the inverse transformation of the TUID. The salt server 10 may generate a set of three or more salts.

Figure 9:
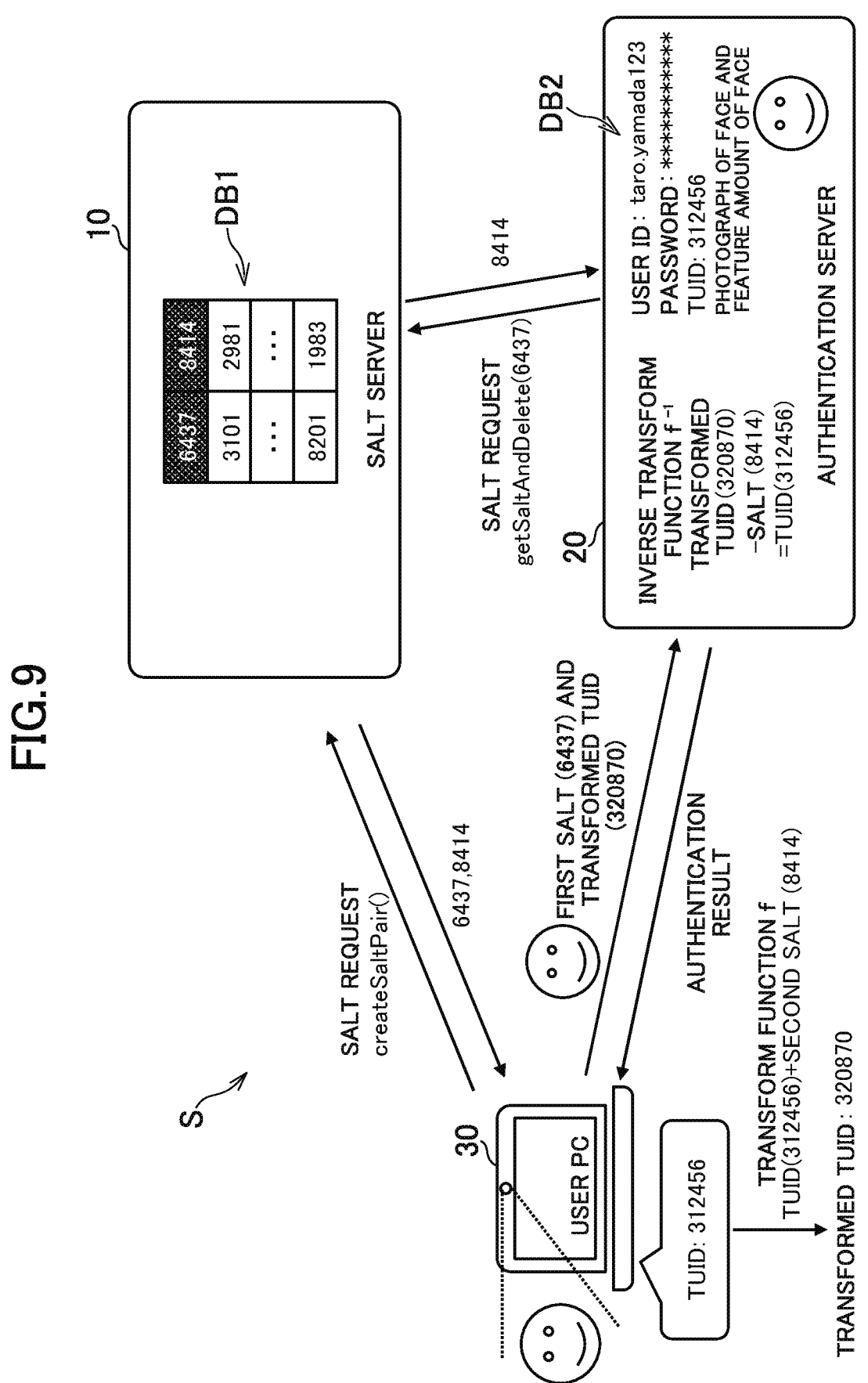
FIG. 9 is a diagram for illustrating an example of a flow of multi-factor authentication in a third embodiment of the present disclosure.

FIG. 9 is a diagram for illustrating an example of a flow of multi-factor authentication in the third embodiment. As illustrated in FIG. 9, a general flow is the same as those of the first embodiment and the second embodiment, but the method of acquiring the salt is different from that of the first embodiment. For example, the user PC 30 transmits a salt request to the salt server 10 in the same manner as in the first embodiment. When the salt server 10 receives the salt request, the salt server 10 generates a pair of salts "6437" and "8414", and stores the pair in the salt database DB1.

In the third embodiment, a case in which the salt server 10 does not store salts in the salt database DB1 in advance but dynamically generates a pair of salts immediately when a salt request is received is described. Instead of dynamically generating a pair of salts immediately, the salt database DB1 may store a large number of salts in advance, and the salt server 10 may acquire a pair of salts from the salt database DB1. The pair of salts may be automatically deleted after a certain period of time.

In the example of FIG. 9, the salt server 10 transmits the pair of salts "6437" and "8414" to the user PC 30. When the user PC 30 receives the pair of salts "6435" and "8414" from the salt server 10, the user PC 30 transforms the TUID "312456" based on the second salt "8414". In the example of FIG. 9, the second salt "8414" is added to the TUID "312456" to obtain "320870" as the transformed TUID. The user PC 30 transmits, to the authentication server 20, an authentication request including the photograph of the face of the user generated by the photographing unit 36, the first salt "6437", and the transformed TUID "320870".

When the authentication server 20 receives the authentication request, the authentication server 20 transmits a salt request including the first salt "6437" to the salt server 10. This salt request is different from the salt request transmitted by the user PC 30. This salt request includes a command to delete the pair of salts transmitted to the user PC 30. When the salt server 10 receives the salt request, the salt server 10 refers to the salt database DB1 to acquire the second salt "8414" associated with the first salt "6437" included in the salt request, and transmits the second salt "8414" to the authentication server 20. The salt server 10 deletes the pair of salts "6437" and "8414" from the salt database DB1. The first salt "6437" is used as a query and index for searching for the second salt "8414".

When the authentication server 20 receives the second salt "8414" from the salt server 10, the authentication server 20 inversely transforms the transformed TUID "320870" received from the user PC based on this salt "8414". In the example of FIG. 9, a transform function $f^{-1}$ for subtracting the salt "8414" from the TUID "320870" is used. The authentication server 20 acquires the TUID "312456" by the inverse transformation. The subsequent flow of the multi-factor authentication is the same as in the first embodiment.

Figure 10:
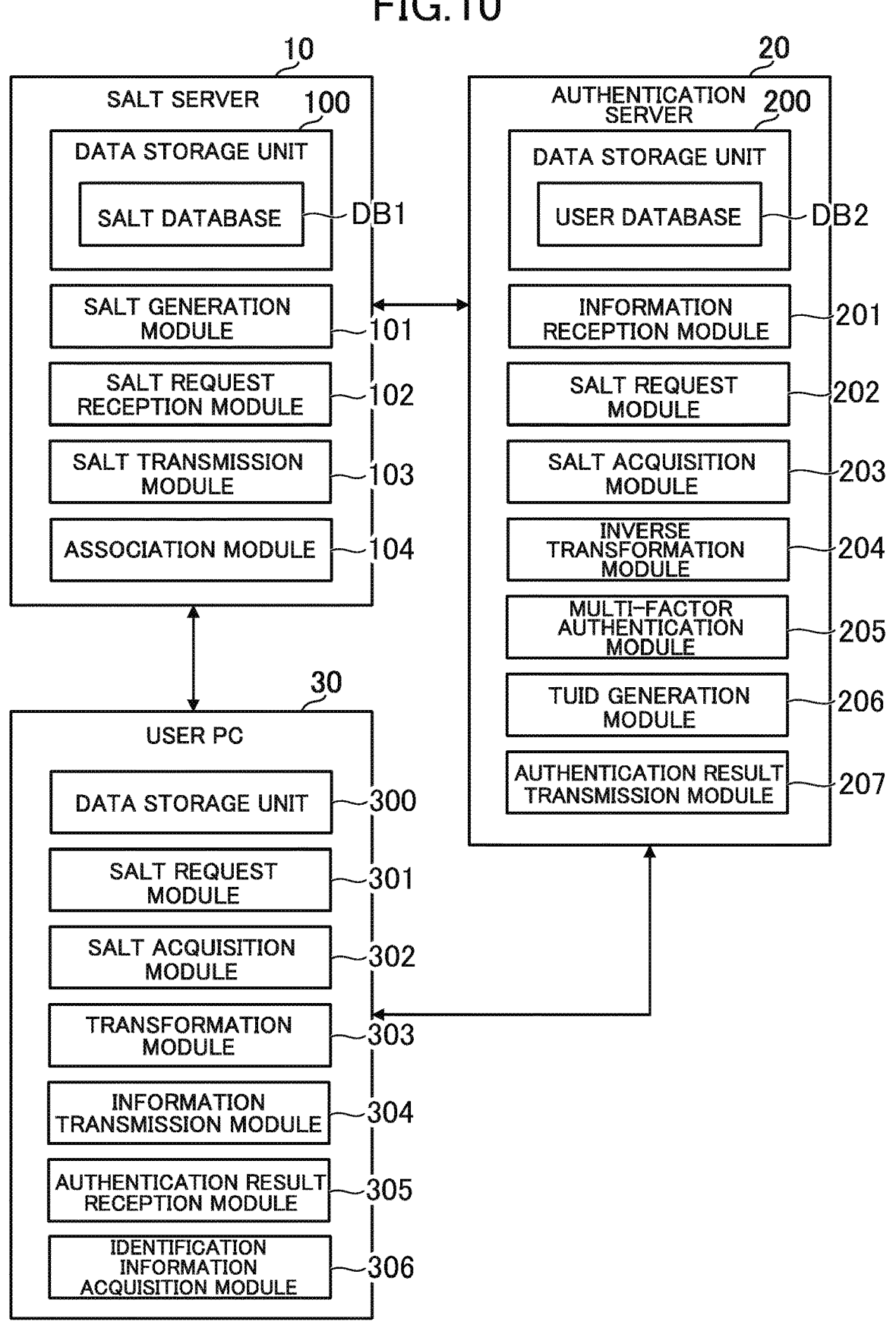
FIG. 10 is a diagram for an example of functional blocks implemented by an authentication system according to the third embodiment.

FIG. 10 is a diagram for illustrating an example of functional blocks implemented by the authentication system S according to the third embodiment. As illustrated in FIG. 10, in the third embodiment, an association module 104 and an identification information acquisition module 306 are implemented. The association module 104 is implemented mainly by the control unit 11. The identification information acquisition module 306 is implemented mainly by the control unit 31.

The association module 104 associates the first salt and the second salt to each other. Associating as used herein refers to enabling one to be retrieved based on the other. For example, storing in the same record in the salt database DB1 corresponds to associating. The first salt is an example of predetermined identification information. The second salt is an example of the transformation information and inverse transformation information. Accordingly, the first salt as used herein can be read as "identification information." The second salt as used herein can be read as "transformation information" or "inverse transformation information."

The identification information is information capable of identifying at least one of the transformation information or the inverse transformation information. The identification information may be any information, and is not limited to the first salt. For example, the identification information may be a number that increments or decrements each time a second salt is generated, or an ID generated by a method different from the method for the salt. For example, the identification information may be an IP address or MAC address of the user PC 30. For example, the second salt may correspond to the identification information, and the first salt may correspond to the transformation information and inverse transformation information. The transformation information and inverse transformation information may be separate salts, and the identification information may be further another salt associated with those separate salts. In this case, a total of three salts are acquired.

For example, when a salt request is received from the user PC 30, the association module 104 generates a first salt and a second salt, and associates the first salt and the second salt with each other. A method itself of generating a salt may be the same as in the first embodiment and the second embodiment. The association module 104 may be executed as processing of the salt generation module 101. The association module 104 generates a pair of salts, and stores one of the pair as the first salt and the other as the second salt in the salt database DB1. In the third embodiment, the salt request is an example of a generation request. Accordingly, the salt request as used herein can be read as "generation request." The generation request be any request for generating a salt, and is not limited to the salt request. The generation request may be a request separate from the salt request.

The identification information acquisition module 306 acquires the first salt. For example, when the first salt is generated in response to the salt request, the identification information acquisition module 306 acquires the first salt generated in response to the salt request. The salt acquisition module 302 acquires the second salt generated in response to the salt request. The information transmission module 304 further transmits the first salt to the authentication server 20. The information reception module 201 further receives the first salt from the user PC 30. The salt acquisition module 302 acquires the second salt associated with the first salt. A flow thereof is as described with reference to FIG. 9.

According to the authentication system S of the third embodiment, the first salt and the second salt are associated with each other, and the second salt is used to transform a TUID. The first salt is transmitted to the authentication server 20 together with the transformed TUID. The authentication server 20 acquires the second salt associated with the first salt to inversely transform the transformed TUID. Thus, the transformed TUID is transmitted over a network, and it becomes difficult for a third party to acquire the TUID, thereby enhancing security in multi-factor authentication. Even when a malicious third party steals the salt request, it is difficult to grasp the mechanism for the transformation based only on the first salt, thereby further enhancing security in multi-factor authentication.

Further, when a salt request is received from the user PC 30, the authentication system S generates a first salt and a second salt, and associates the first salt and the second salt with each other. Thus, the salt can be dynamically generated each time a salt request is received, and hence the same salt is no longer repeatedly used for a certain period of time, thereby further enhancing security in multi-factor authentication. In addition, when the salt server 10 is configured to immediately delete a pair of salts, it becomes difficult for a third party to obtain the pair of salts, thereby further enhancing security.

4. Fourth Embodiment

In the first embodiment to the third embodiment, the case in which security in multi-factor authentication is enhanced by devising the method of acquiring the salt has been described. A method of enhancing security in multi-factor authentication is not limited to the examples of the first embodiment to the third embodiment. In the fourth embodiment, the user PC enhances security in multi-factor authentication by selectively using the transform function "f" in accordance with the time slot in which the TUID is transformed. The user PC 30 stores a plurality of transform functions "f" in advance, and can transform the TUID through use of any one of the transform functions "f".

Figure 11:
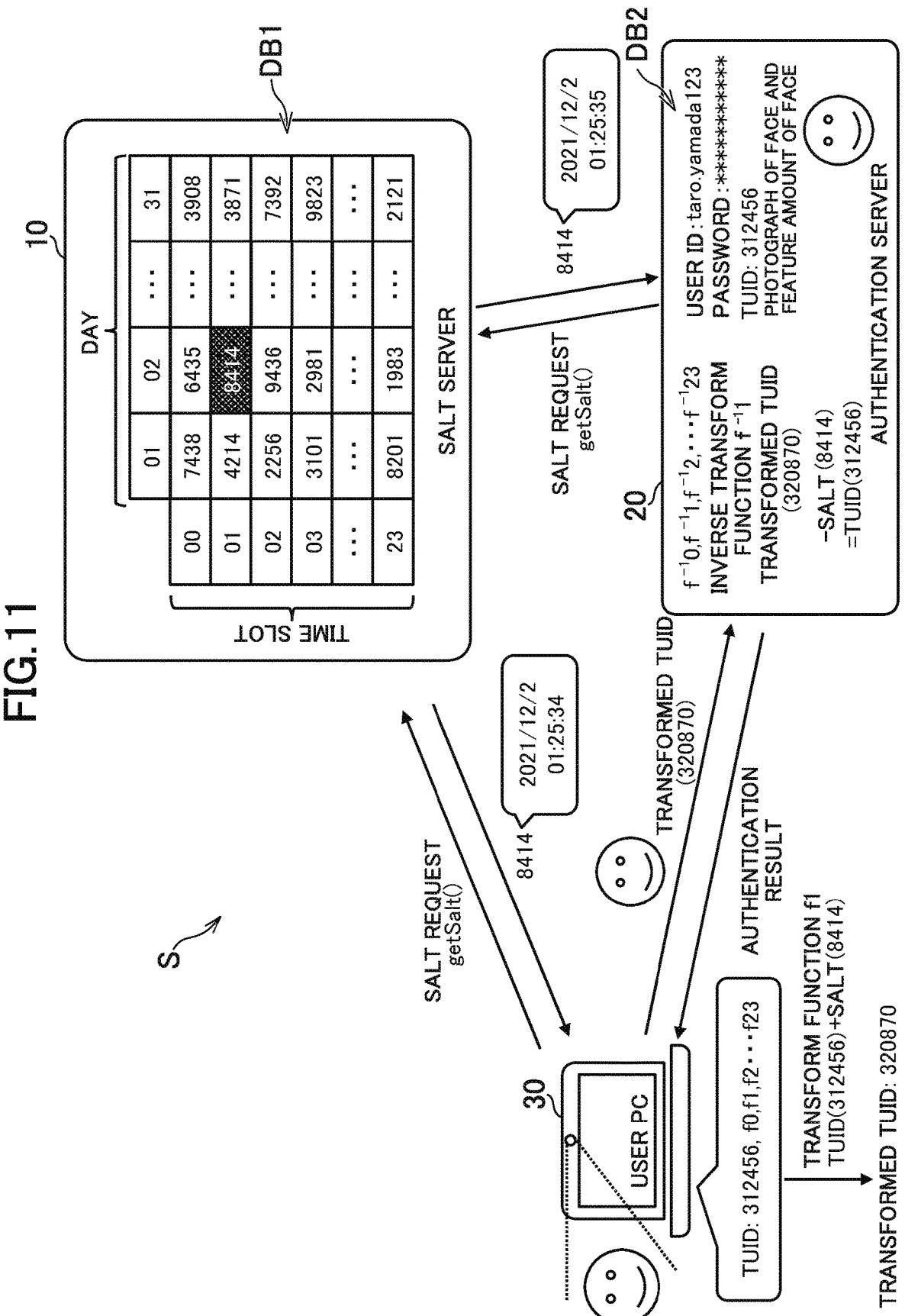
FIG. 11 is a diagram for illustrating an example of a flow of multi-factor authentication in a fourth embodiment of the present disclosure.

FIG. 11 is a diagram for illustrating an example of a flow of multi-factor authentication in the fourth embodiment. In the fourth embodiment, a general flow may be the same as in the first embodiment to the third embodiment. In the example of FIG. 11, the same method of acquiring the salt as that of the first embodiment is taken as an example. A flow to be performed until the user PC 30 acquires a salt is the same as in the first embodiment. The user PC 30 acquires the salt "8414" corresponding to the current day "02" and the time slot "01:00" from the salt server 10.

In the fourth embodiment, the user PC 30 selectively uses the transform function "f" based on the time slot in which the TUID is transformed. For example, the user PC 30 stores transform functions f0 to f23 corresponding to the time slots from the hour "00" to the hour "23", respectively. The transform functions f0 to f23 are hereinafter referred to simply as "transform function f" unless distinguished. It is assumed that calculation methods indicated by the individual transform functions "f" are different from each other. Thus, even with the same salt being used, when the transform function "f" differs, the value of the transformed TUID differs as well.

In the example of FIG. 11, the time slot in which the TUID is transformed is the hour "01", and hence the user PC 30 selects the transform function f1 from among the transform functions f0 to f23. The transform function f1 is assumed to be the same as the transform function "f" described in the first embodiment with reference to FIG. 2. Thus, the user PC 30 transforms the TUID in the same manner as in the first embodiment, and transmits the transformed TUID to the authentication server 20. When the authentication server 20 receives the transformed TUID, the authentication server 20 acquires a salt from the salt server 10 in the same manner as in the first embodiment.

In the fourth embodiment, the authentication server 20 selectively uses the inverse transform function $f^{-1}$ based on the time slot in which the TUID is transformed. For example, the authentication server 20 stores inverse transform functions $f^{-1}0$ to $f^{-1}23$ corresponding to the time slots from the hour "00" to the hour "23", respectively. The inverse transform functions $f^{-1}0$ to $f^{-1}23$ are hereinafter referred to simply as "inverse transform function $f^{-1}$" unless distinguished. The calculation methods indicated by the individual inverse transform functions $f^{-1}$ are different from each other. Thus, with the same salt being used, when the inverse transform function $f^{-1}$ differs, the value of the inversely transformed TUID differs as well.

The calculation method indicated by each individual inverse transform function $f^{-1}$ corresponds to the transform function "f" associated with the same time slot. In order to obtain a correct TUID, it is required to perform inverse transformation through use of the inverse transform function $f^{-1}$ corresponding to the transform function "f" used by the user PC 30. In the example of FIG. 11, the time slot in which the TUID is inversely transformed is the hour "01", and hence the inverse transform function $^{-1}f1$ is selected from among the inverse transform functions $f^{-1}0$ to $f^{-1}23$. The inverse transform function $f^{-1}1$ corresponds to the transform function f1 used by the user PC 30. Thus, the authentication server 20 can acquire a correct TUID by transforming the TUID in the same manner as in the first embodiment. The subsequent flow of the multi-factor authentication is the same as in the first embodiment.

Figure 12:
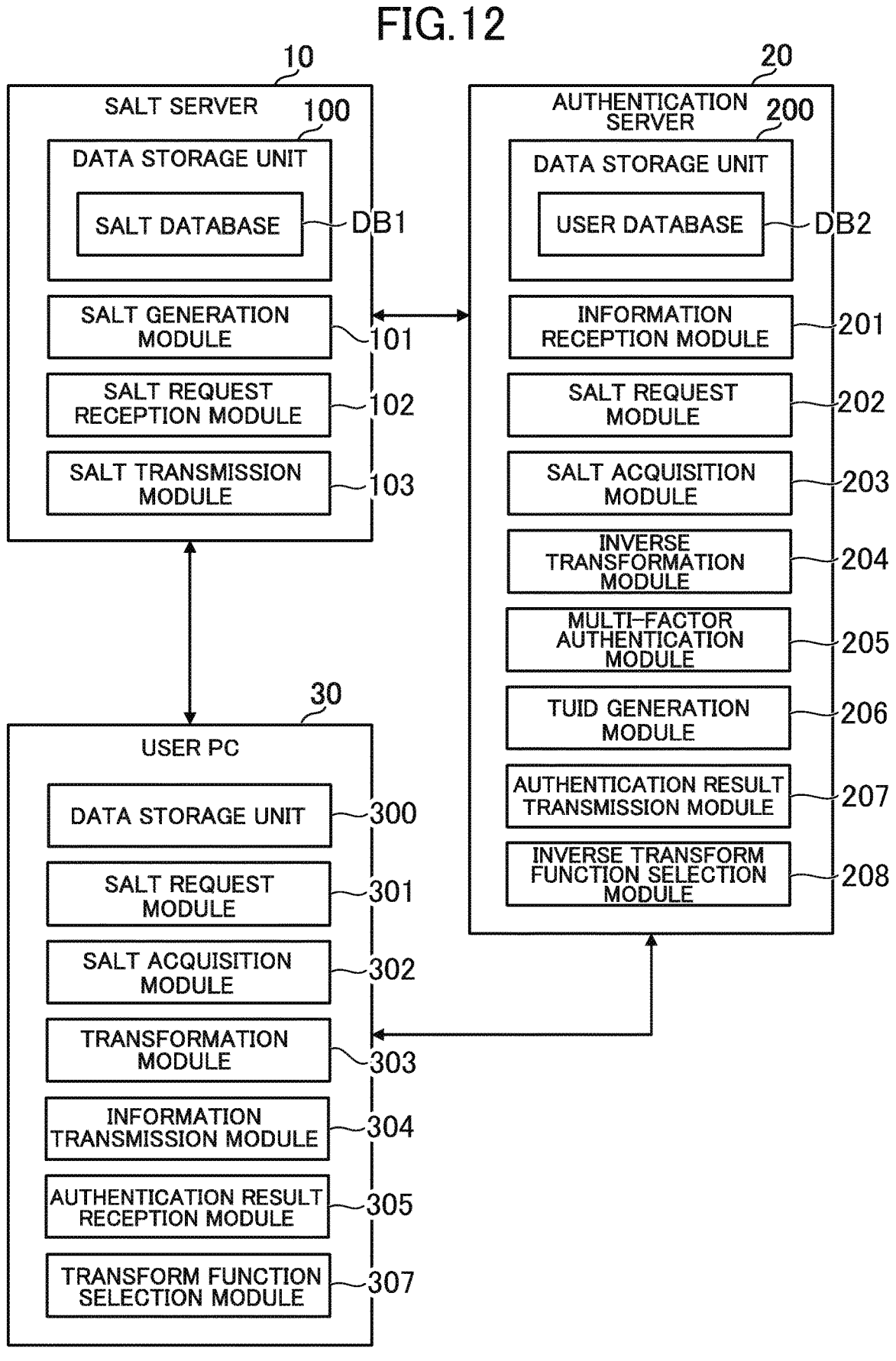
FIG. 12 is a diagram for illustrating an example of functional blocks implemented by an authentication system according to the fourth embodiment.

FIG. 12 is a diagram for illustrating an example of functional blocks implemented by the authentication system S according to the fourth embodiment. As illustrated in FIG. 12, in the fourth embodiment, an inverse transform function selection module 208 and a transform function selection module 307 are implemented. The inverse transform function selection module 208 is implemented mainly by the control unit 21. The transform function selection module 307 is implemented mainly by the control unit 31.

The transform function selection module 307 selects one of the plurality of transform functions "f". The transform function "f" is an example of a transformation method. Accordingly, the transform function "f" as used herein can be read as "transformation method." The transformation method is a method of transforming the TUID. The transformation method is not limited to the transform function "f" as long as the transformation method defines how to transform the TUID. For example, the transformation method may be a calculation formula that is not called "function" or may be an encryption algorithm.

The transform function selection module 307 is only required to select one of the plurality of transform functions "f" based on a predetermined selection method. In the fourth embodiment, a case of using the time slot as an example of the selection method is described. The transform function selection module 307 selects the transform function "f" corresponding to the time slot. It is assumed that a relationship between the time slot and the transform function "f" is defined in the data storage unit 300 in advance. The transform function selection module 307 selects the transform function "f" corresponding to the current time slot. In the fourth embodiment, the numerical values "00" to "23" indicated by the time slots correspond to the numerical values included in the transform functions "f" to "f23", respectively.

The time slot is an example of a first transformation period. Accordingly, the time slot as used herein can be read as "first transformation period." The first transformation period is a period to which a first transformation time point at which the TUID is transformed belongs. In the first embodiment, a case in which the first transformation period is represented by the time slot is described, but the first transformation period may be represented by a combination of a day and time slot, or may be represented only by a day. Even when the first transformation period has another meaning, the transform function selection module 307 selects the transform function "f" corresponding to the first transformation period to which the first transformation time point at which the TUID is transformed belongs. It is assumed that the relationship between each individual period and the transform function "f" is defined in the data storage unit 300 in advance. In the same manner as in the first acquisition period, the first transformation period is not limited to the hourly basis, and may be any length.

The transformation module 303 transforms the TUID based on the salt through use of the transform function "f" selected by the transform function selection module 307. The fourth embodiment differs from the first embodiment to the third embodiment in that the transform function "f" selected by the transform function selection module 307 is used, but other points are the same.

The inverse transform function selection module 208 selects an inverse transform function $f^{-1}$ corresponding to the transform function "f" selected by the transform function selection module 307 from among a plurality of inverse transform functions $f^{-1}$. The inverse transform function $f^{-1}$ is an example of an inverse transformation method. Accordingly, the inverse transform function $f^{-1}$ as used herein can be read as "inverse transformation method." The inverse transformation method is a method of inversely transforming the transformed TUID. The inverse transformation method is not limited to the inverse transform function $f^{-1}$ as long as the inverse transformation method defines how to inversely transform the transformed TUID. For example, the inverse transformation method may be a calculation formula that is not called "function" or may be a decryption algorithm.

The inverse transform function selection module 208 is only required to select one of the plurality of inverse transform functions $f^{-1}$ based on a predetermined selection method. In the fourth embodiment, a case of using the time slot as an example of the selection method is described. The inverse transform function selection module 208 selects the inverse transform function $f^{-1}$ corresponding to the time slot. It is assumed that a relationship between the time slot and the inverse transform function $f^{-1}$ is defined in the data storage unit 200 in advance. The inverse transform function selection module 208 selects the inverse transform function $f^{-1}$ corresponding to the current time slot. For example, the inverse transform function selection module 208 selects the inverse transform function $f^{-1}$ corresponding to the first transformation period as the inverse transform function $f^{-1}$ corresponding to the transform function "f" selected by the transform function selection module 307.

The inverse transformation module 204 inversely transforms the transformed TUID based on the salt through use of the inverse transform function $f^{-1}$ selected by the inverse transform function selection module 208. The fourth embodiment differs from the first embodiment to the third embodiment in that the inverse transform function $f^{-1}$ selected by the inverse transform function selection module 208 is used, but other points are the same.

According to the authentication system S of the fourth embodiment, a TUID is transformed based on a salt through use of the transform function "f" selected from among a plurality of transform functions "f". The authentication system S inversely transforms the transformed TUID based on the salt through use of the inverse transform function $f^{-1}$ selected from among the plurality of inverse transform functions $f^{-1}$. Thus, the transformed TUID is transmitted over a network, and it becomes difficult for a third party to acquire the TUID, thereby enhancing security in multi-factor authentication. In addition, the transform function "f" is dynamically changed, and hence it becomes difficult for a third party to grasp the mechanism for the transformation, thereby further enhancing security in multi-factor authentication.

Further, the authentication system S selects the inverse transform function $f^{-1}$ corresponding to the first transformation period as the inverse transform function $f^{-1}$ corresponding to the transform function "f" corresponding to the first transformation period to which the first transformation time point at which the TUID is transformed belongs. Thus, the transform function "f" is changed in accordance with a period, thereby lowering a frequency with which the same transform function "f" is repeatedly used, and it becomes difficult for a third party to grasp the mechanism for the transformation.

Further, in the authentication system S, the first transformation period is represented by a time slot, the transform function selection module 307 selects the transform function "f" corresponding to the time slot, and the inverse transform function selection module 208 selects the inverse transform function $f^{-1}$ corresponding to the time slot. Thus, the transform function "f" is changed in accordance with a shorter period, thereby lowering the frequency with which the same transform function "f" is repeatedly used, and it becomes difficult for a third party to grasp the mechanism for the transformation.

5. Fifth Embodiment

The transform function "f" and the inverse transform function $f^{-1}$ can be selected by any other selection method, and the selection method is not limited to the example of the fourth embodiment. In the fifth embodiment, a case of using a pair of salts generated by the salt server 10 instead of such a temporal condition as the time slot is taken as an example. A method of generating the pair of salts in the fifth embodiment is the same as that of the third embodiment. In the fifth embodiment, the salt server 10 generates a pair of salts, and the generated pair is used to select the transform function "f" and the inverse transform function $f^{-1}$.

Figure 13:
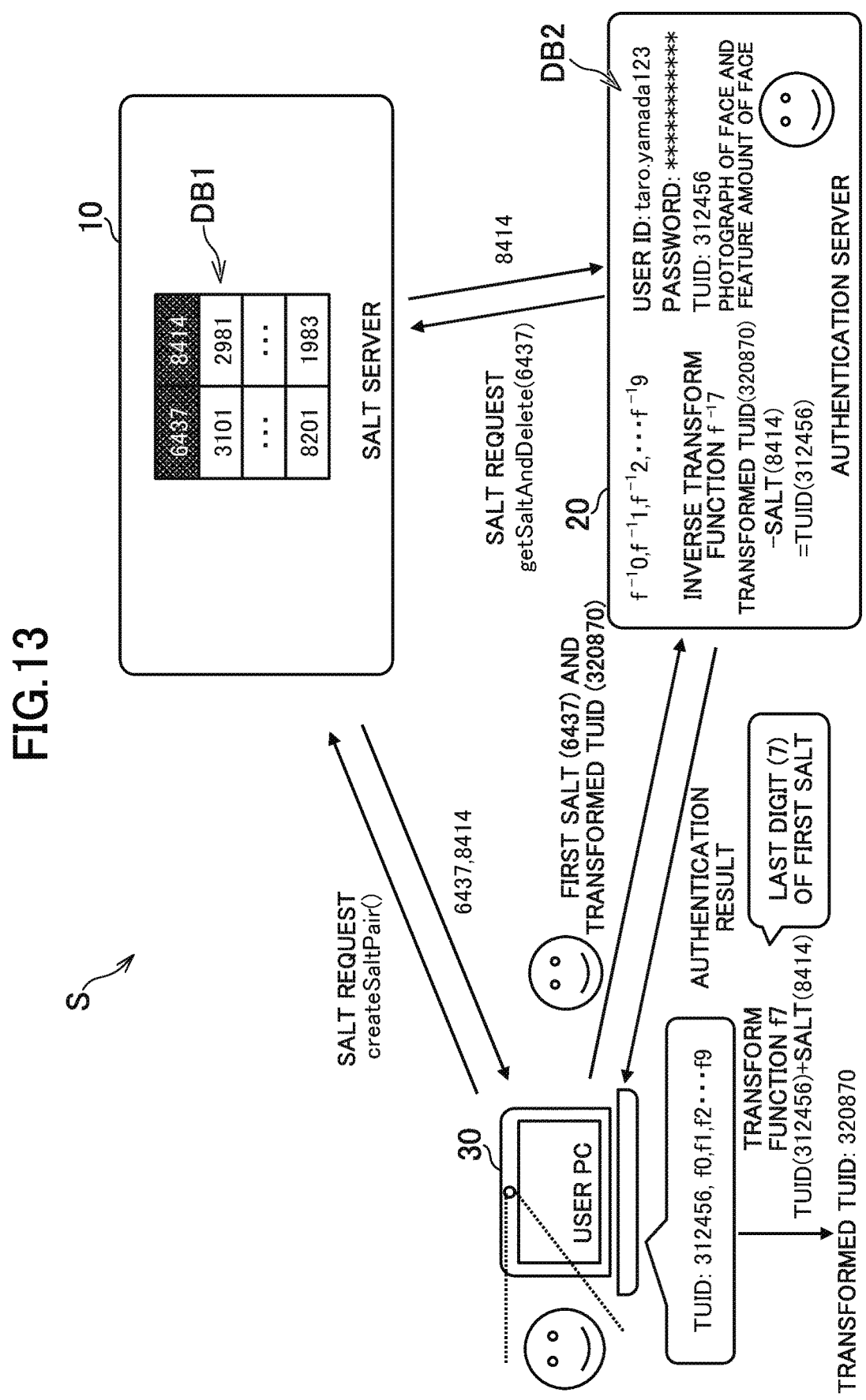
FIG. 13 is a diagram for illustrating an example of a flow of multi-factor authentication in a fifth embodiment of the present disclosure.

FIG. 13 is a diagram for illustrating an example of a flow of multi-factor authentication in the fifth embodiment. As illustrated in FIG. 13, a general flow is the same as that of the third embodiment, but the fifth embodiment is different from the third embodiment in that a plurality of transform functions f0 to f9 and a plurality of inverse transform functions $f^{-1}$ are provided. For example, the user PC 30 acquires the pair of salts "6437" and "8414" from the salt server 10 in the same manner as in the third embodiment.

The user PC 30 selectively uses the transform function "f" based on the last digit of the first salt. For example, the user PC 30 stores transform functions f1 to f9 corresponding to the last digits "0" to "9", respectively. In the example of FIG. 13, the transform function f7 corresponding to the last digit "7" of the first salt "6437" is selected. This transform function f7 is assumed to be the same as the transform function "f" described in the third embodiment with reference to FIG. 9. Processing to be performed by the user PC 30 after the transform function f7 is selected is the same as in the third embodiment. When the authentication server 20 receives the transformed TUID, the authentication server 20 acquires the pair of salts "6437" and "8414" from the salt server 10 in the same manner as in the third embodiment.

In the fifth embodiment, the authentication server 20 selectively uses the inverse transform function $f^{-1}$ based on the last digit of the first salt. For example, the user PC 30 stores the inverse transform functions $f^{-1}1$ to $f^{-1}9$ corresponding to the last digits "0" to "9", respectively. In the example of FIG. 13, the inverse transform function $f^{-1}7$ corresponding to the last digit "7" of the first salt "6437" is selected. This inverse transform function $f^{-1}7$ is assumed to be the same as the inverse transform function $f^{-1}$ described in the third embodiment with reference to FIG. 9. A flow of the multi-factor authentication including processing to be performed by the authentication server 20 after the inverse transform function $f^{-1}7$ is selected is the same as in the third embodiment.

The authentication system S according to the fifth embodiment includes the association module 104 and the identification information acquisition module 306, which are the same as those in the third embodiment. Processing to be performed by the information reception module 201, the salt acquisition modules 203 and 302, and the information transmission module 304 is also substantially the same as that described in the third embodiment. The inverse transform function selection module 208 in the fifth embodiment selects the inverse transform function $f^{-1}$ based on the first salt. It is assumed that a relationship between the first salt and the inverse transform function $f^{-1}$ is defined in the data storage unit 200 in advance. The inverse transform function selection module 208 selects the transform inverse function $f^{-1}$ corresponding to the first salt. In the fifth embodiment, a case of using the last digit of the first salt is described, but the inverse transform function selection module 208 may select the inverse transform function $f^{-1}$ based on another part of the first salt.

According to the authentication system S of the fifth embodiment, the first salt and the second salt are associated with each other, and a TUID is transformed through use of the second salt. The first salt is transmitted to the authentication server 20 together with the transformed TUID. The authentication server 20 acquires the second salt associated with the first salt, and inversely transforms the transformed TUID based on the inverse transform function $f^{-1}$ selected based on the first salt. Thus, the transform function "f" is dynamically changed, and hence it becomes difficult for a third party to grasp the mechanism for the transformation, thereby further enhancing security in multi-factor authentication. Even when a malicious third party steals the salt request, it is difficult to grasp the mechanism for the transformation based only on the first salt, thereby further enhancing security in multi-factor authentication.

Further, when a salt request is received from the user PC 30, the authentication system S generates a first salt and a second salt, and associates the first salt and the second salt with each other. Thus, the salt can be dynamically generated each time a salt request is received, and hence the same salt is no longer repeatedly used for a certain period of time, thereby further enhancing security in multi-factor authentication. In addition, when the salt server 10 is configured to immediately delete a pair of salts, it becomes difficult for a third party to obtain the pair of salts, thereby further enhancing security.

6. Sixth Embodiment

In the fourth embodiment and the fifth embodiment, the case in which the authentication server 20 and the user PC 30 select the inverse transform function $f^{-1}$ and the transform function "f", respectively, has been described, but the inverse transform function $f^{-1}$ and the transform function "f" may be selected by a third party server.

Figure 14:
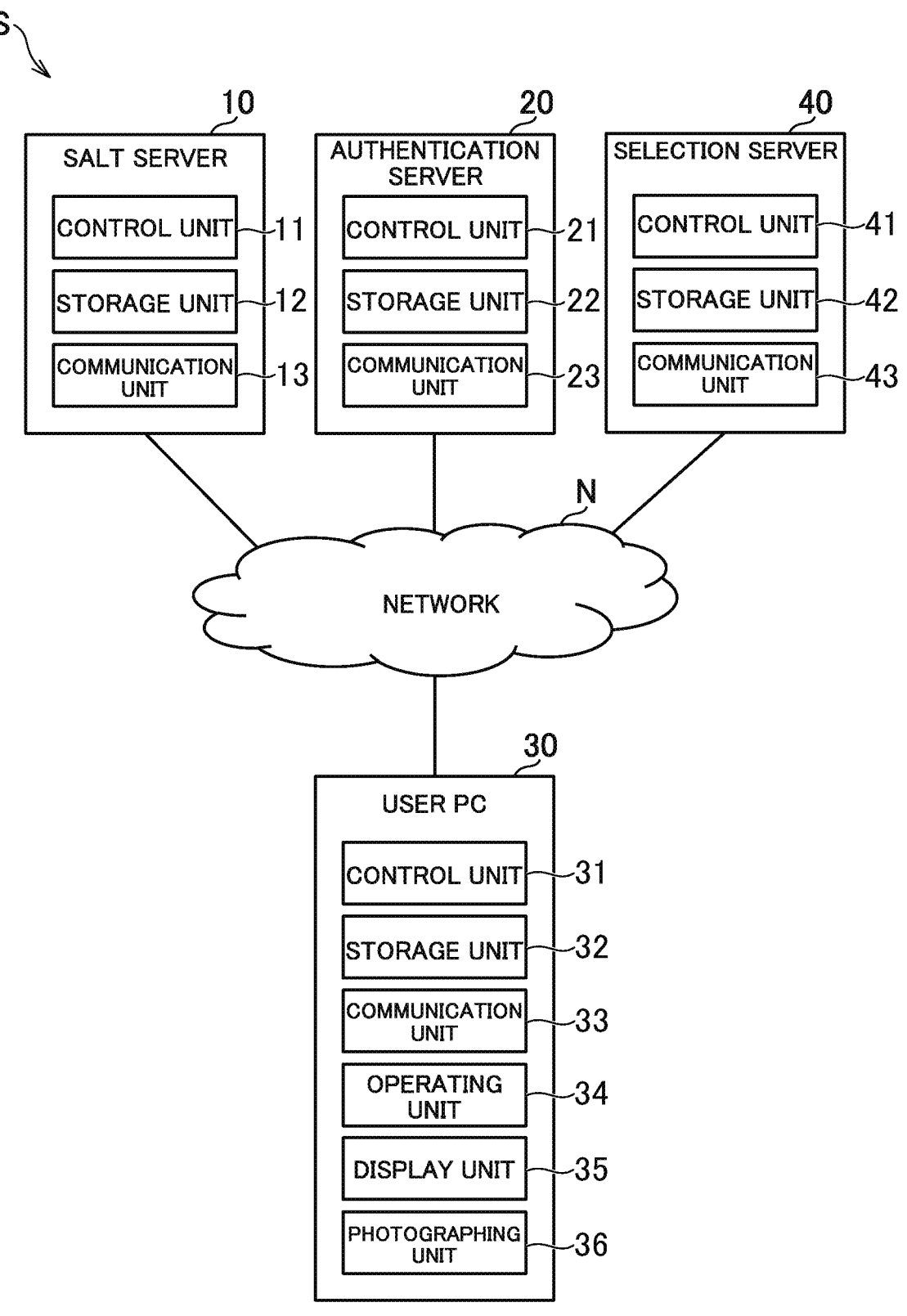
FIG. 14 is a diagram for illustrating an example of an overall configuration of an authentication system according to a sixth embodiment of the present disclosure.

FIG. 14 is a diagram for illustrating an example of an overall configuration of the authentication system S according to the sixth embodiment. As illustrated in FIG. 14, the authentication system S according to the sixth embodiment includes a selection server 40. The selection server 40 is a server computer. Physical configurations of a control unit 41, a storage unit 42, and a communication unit 43 may be the same as those of the control unit 11, the storage unit 12, and the communication unit 13, respectively. The selection server 40 is an example of a selection device. Accordingly, the selection server 40 as used herein can be read as "selection device."

The selection device is a device that selects the transform function "f" and the inverse transform function $f^{-1}$. The selection device may be any device, and is not limited to the selection server 40 or another server computer. For example, the selection device may be a personal computer, a tablet terminal, or a smartphone. In addition, for example, the selection device may be a game machine, a vending machine, a POS terminal, an ATM, or another device.

Figure 15:
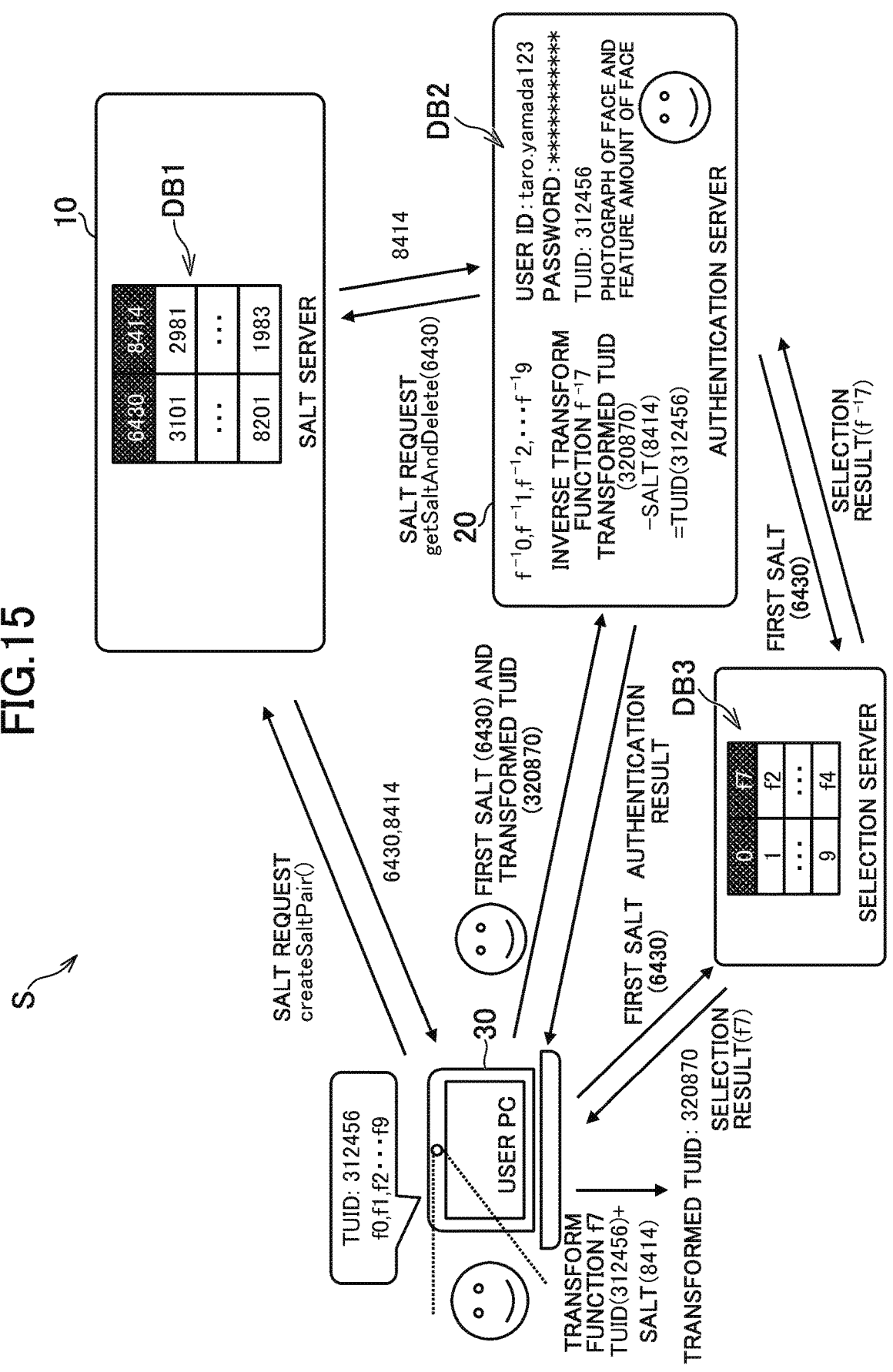
FIG. 15 is a diagram for illustrating an example of a flow of multi-factor authentication in the sixth embodiment.

FIG. 15 is a diagram for illustrating an example of a flow of multi-factor authentication in the sixth embodiment. In the sixth embodiment, a general flow may be the same as in the fourth embodiment or the fifth embodiment. In the example of FIG. 15, the same selection method as that of the fifth embodiment is taken as an example. A flow to be performed until the user PC 30 acquires a pair of salts is the same as in the fifth embodiment. In FIG. 15, "6430" is set as the first salt.

In the sixth embodiment, the user PC 30 transmits the first salt "6430" to the selection server 40. The selection server 40 stores a function database DB3. The function database DB3 is associated with the last digit of the first salt, the transform function "f", and the inverse transform function $f^{-1}$. In the example of FIG. 15, the inverse transform function "f" corresponds to the inverse transform function $f^{-1}$ to which the same numerical value as the suffix of the inverse transform function "f" is suffixed, and hence only the transform function "f" is shown in the function database DB3, but the function database may store both the transform function "f" and the inverse transform function $f^{-1}$. It is assumed that the association in the function database DB3 is updated at a predetermined timing. For example, the selection server 40 periodically updates the association in the function database DB3 at random.

The selection server 40 selects the transform function "f" based on the last digit "0" of the first salt received from the user PC 30. The selection server 40 is the one that selects the transform function "f", but the selection itself of the transform function "f" may be the same as in the fourth embodiment and the fifth embodiment. The selection server 40 transmits a selection result "f7" of the transform function "f" to the user PC 30. When the user PC 30 receives the selection result "f7" of the transform function "f", the user PC 30 transforms a TUID. This transformation itself may be the same as in the fourth embodiment and the fifth embodiment. The subsequent flow is the same as in the fifth embodiment until the authentication server 20 acquires a pair of salts from the salt server 10.

The authentication server 20 transmits the first salt "6430" to the selection server 40. The selection server 40 selects the inverse transform function $f^{-1}7$ based on the last digit of the first salt received from the authentication server 20. The selection server 40 is the one that selects the inverse transform function $f^{-1}7$, but the selection itself of the inverse transform function $f^{-1}$ may be the same as in the fourth embodiment and the fifth embodiment. The selection server 40 transmits a selection result "$f^{-1}7$" of the inverse transform function $f^{-1}$ to the authentication server 20. When the authentication server 20 receives the selection result of the inverse transform function $f^{-1}$, the authentication server 20 inversely transforms the transformed TUID. This inverse transformation itself may be the same as in the fourth embodiment and the fifth embodiment. The subsequent flow of the multi-factor authentication is the same as in the fourth embodiment and the fifth embodiment.

FIG. 16 is a diagram for illustrating an example of functional blocks implemented by the authentication system S according to the sixth embodiment. As illustrated in FIG. 16, in the sixth embodiment, a transform function request module 308, an inverse transform function request module 209, a data storage unit 400, a first transmission module 401, and a second transmission module 402 are implemented. The inverse transform function request module 209 is implemented mainly by the control unit 21. The transform function request module 308 is implemented mainly by the control unit 31. The data storage unit 400 is implemented mainly by the storage unit 42. The first transmission module 401 and the second transmission module 402 are implemented mainly by the control unit 41.

The transform function request module 308 requests the selection server 40 to select the transform function "f". This request is hereinafter referred to as "transform function selection request." The transform function selection request may be issued in a predetermined format. The transform function selection request may include information that serves as a reference for the selection server 40 to select the transform function "f", or may include only a command to select the transform function "f". In the sixth embodiment, a case in which the transform function selection request includes the first salt is described.

The inverse transform function request module 209 requests the selection server 40 to select the inverse transform function $f^{-1}$. This request is hereinafter referred to as "inverse transform function selection request." The inverse transform function selection request may be issued in a predetermined format. The inverse transform function selection request may include information that serves as a reference for the selection server 40 to select the inverse transform function $f^{-1}$, or may include only a command to select the inverse transform function $f^{-1}$. In the sixth embodiment, a case in which the inverse transform function selection request includes the first salt is described.

When the transform function selection request is received from the user PC 30, the first transmission module 401 transmits the selection result of any one of the plurality of transform functions "f" to the user PC 30. When the transform function selection request is received, the selection server 40 selects any one of the plurality of transform functions "f" based on a predetermined selection method. In the sixth embodiment, in the same manner as in the fifth embodiment, the case in which this selection method involves use of the value of the last digit of the first salt is described, but the selection method may be any other method. For example, the selection method may involve use of the value of the first digit of the first salt or the value of the second salt. In addition, for example, in the same manner as in the fourth embodiment, the selection method may involve use of a time slot in which the transform function selection request was received. The first transmission module 401 transmits, as the selection result, information that can identify the transform function "f" selected by the selection server 40.

When the inverse transform function selection request is received from the authentication server 20, the second transmission module 402 transmits the selection result of any one of the plurality of inverse transform functions $f^{-1}$ to the authentication server 20. When the inverse transform function selection request is received, the selection server 40 selects any one of the plurality of inverse transform functions $f^{-1}$ based on a predetermined selection method. In the sixth embodiment, in the same manner as in the fifth embodiment, the case in which this selection method involves use of the value of the last digit of the first salt is described, but the selection method may be any other method. For example, the selection method may involve use of the value of the first digit of the first salt or the value of the second salt. In addition, for example, in the same manner as in the fourth embodiment, the selection method may involve use of a time slot in which the inverse transform function selection request was received. The second transmission module 402 transmits, as the selection result, information that can identify the inverse transform function $f^{-1}$ selected by the selection server 40.

The transform function selection module 307 selects the transform function "f" based on the selection result obtained by the selection server 40. The sixth embodiment differs from the fourth embodiment and the fifth embodiment in that the transform function "f" selected by the selection server 40 is used, but other points are the same.

The inverse transform function selection module 208 selects the inverse transform function $f^{-1}$ based on the selection result obtained by the selection server 40. The sixth embodiment differs from the fourth embodiment and the fifth embodiment in that the inverse transform function $f^{-1}$ selected by the selection server 40 is used, but other points are the same.

According to the authentication system S of the sixth embodiment, the selection server 40 selects the inverse transform function $f^{-1}$ and the transform function "f" based on requests from the authentication server 20 and the user PC 30. Thus, the authentication server 20 and the user PC 30 are no longer required to have an algorithm for selecting the inverse transform function $f^{-1}$ and the transform function "f", and hence it is possible to simplify a mechanism of the multi-factor authentication. Further, the inverse transform function $f^{-1}$ and the transform function "f" defined in the function database DB3 can be easily changed periodically, and hence it becomes difficult for a third party to guess the mechanism for the transformation, thereby enhancing security.

7. Modification Examples

Note that, the present disclosure is not limited to the first embodiment to the sixth embodiment, which have been described above, and can be modified suitably without departing from the spirit of the present disclosure.

7-1. Modification Example 1

For example, in the example of FIG. 2 for illustrating the first embodiment, it is assumed that a time point at which the salt request was received from the user PC 30 is "01:59:59 on Dec. 2, 2021" and a time point at which the salt request was received from the authentication server 20 is "02:00:00 on Dec. 2, 2021." In this case, the salt acquired by the user PC 30 is "8414" and a salt acquired by the authentication server 20 is "9436". In this case, the salt used for the transformation of the TUID and the salt used for the inverse transformation of the transformed TUID differ from each other, and hence the authentication server 20 cannot acquire the correct TUID. In view of this, Modification Example 1 of the present disclosure, a case in which information that can identify which time slot the salt used for the transformation of the TUID belongs to is transmitted from the user PC 30 to the authentication server 20 is described.

Figure 17:
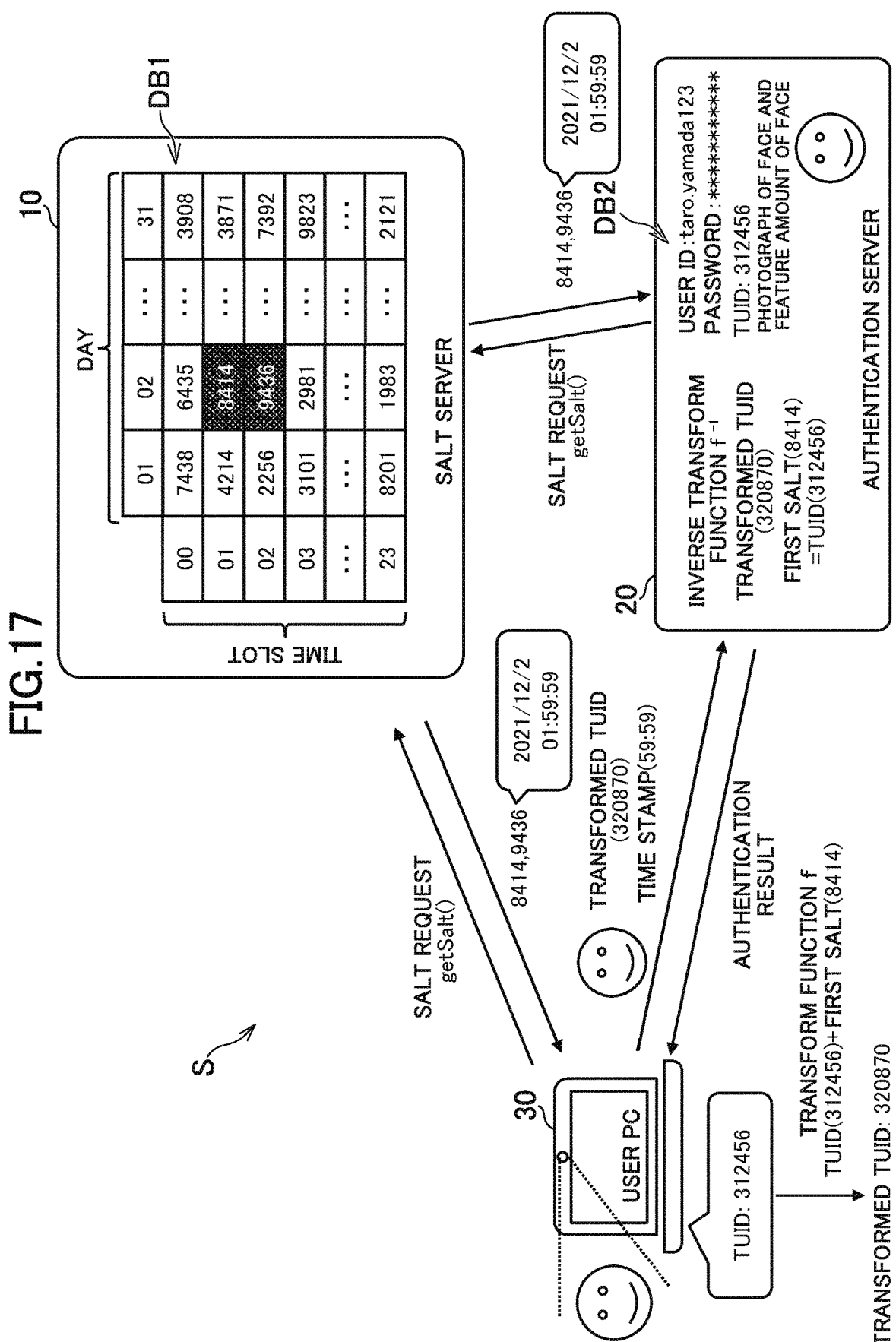
FIG. 17 is a diagram for illustrating an example of a flow of multi-factor authentication in Modification Example 1 of the present disclosure.

FIG. 17 is a diagram for illustrating an example of a flow of multi-factor authentication in Modification Example 1. In Modification Example 1, a flow to be performed until the salt server 10 receives a salt request from the user PC 30 is the same as in the first embodiment. When the salt server 10 receives a salt request from the user PC 30, the salt server 10 transmits, to the user PC 30, the first salt corresponding to the day and time slot to which the current time point belongs and the second salt corresponding to the subsequent time slot.

In the example of FIG. 17, it is assumed that the time point at which the salt request was received from the user PC 30 is "01:59:59 on Dec. 2, 2021." The salt server 10 transmits, to the user PC 30, a pair of the first salt "8414" corresponding to the day "02" and the hour "01" and the second salt "9436" corresponding to the day "02" and the hour "02" being the subsequent time slot. The user PC 30 receives the pair of salts "8414" and "9436" from the salt server 10.

The user PC 30 selects any one of the pair of salts "8414" and "9436". The user PC 30 may select the salt based on a predetermined selection method. In Modification Example 1, a case in which it is determined to select the first salt is taken as an example, but the salt may be selected based on another selection method. For example, the user PC 30 may select the salt based on a time point at which the salt request was transmitted, a time point at which the pair of salts was received, or a time point of selecting the salt.

In the example of FIG. 17, the user PC 30 transforms the TUID "312456" based on the first salt "8414". The transformed TUID is "320870". The user PC 30 transmits, to the authentication server 20, the transformed TUID "320870" and a time stamp "59:59" that can identify the time slot corresponding to the first salt "8414". This timestamp may be the current time point "01:59:59 on Dec. 2, 2021," but only "59:59" is to be transmitted in order to reduce information available to a third party. As the time stamp, any one of the time point at which the salt request was transmitted, the time point at which the pair of salts was received, a time point at which the TUID was transformed, or a time point at which the transformed TUID is transmitted may be used.

When the authentication server 20 receives the transformed TUID "320870" and the time stamp "59:59", the authentication server 20 transmits a salt request to the salt server 10. When the salt server 10 receives the salt request from the authentication server 20, the salt server 10 transmits, to the authentication server 20, a pair of the salt corresponding to the day and time slot to which the current time point belongs and the salt corresponding to the subsequent or previous time slot.

In the example of FIG. 17, it is assumed that the time point at which the salt request was received from the authentication server 20 is "01:59:59 on Dec. 2, 2021." In this case, the salt server 10 transmits, to the authentication server 20, a pair of the first salt "8414" corresponding to the day "02" and the hour "01" and the second salt "9436" corresponding to the day "02" and the hour "02" being the subsequent time slot. The authentication server 20 receives the pair of salts "8414" and "9436" from the salt server 10.

Meanwhile, it is assumed that the time point at which the salt request was received from the authentication server 20 is "02:00:00 on Dec. 2, 2021." In this case, the salt server 10 transmits, to the authentication server 20, a pair of the first salt "8414" corresponding to the day "02" and the hour "01" being the previous time slot and the second salt "9436" corresponding to the day "02" and the hour "02" being the time slot to which the current time point belongs. The authentication server 20 receives the pair of salts "8414" and "9436" from the salt server 10. In this manner, the salt server 10 may control whether to transmit the salt for the previous time slot or to transmit the salt for the subsequent time slot depending on whether the time point is immediately before or after a time slot break.

The authentication server 20 can identify that the salt for the relatively earlier time slot has been used for the transformation based on the time stamp "59:59" received from the user PC 30. That is, it can be identified that, of the pair of salts received from the authentication server 20, the first salt has been used. The authentication server 20 executes inverse transformation on the transformed TUID "320870" based on the first salt "8414". The subsequent flow is the same as in the first embodiment.

Meanwhile, it is assumed that the time stamp received from the user PC 30 is "00:00". In this case, the user PC 30 uses the salt "9436" instead of the salt "8414" to transform the TUID "312456". In this case, the authentication server 20 can identify, based on this time stamp, that the salt for the relatively later time slot has been used for the transformation. That is, the authentication server 20 executes inverse transformation based on the second salt "9436".

In the example of FIG. 17, it is assumed that a time point at which the salt server 10 received the salt request from the user PC 30 is "23:59:59 on Dec. 1, 2021." It suffices that the salt server 10 transmits, to the user PC 30, a first salt "8201" corresponding to the day "01" and the hour "23" and the second salt "6435" corresponding to the subsequent day "02" and the hour "00".

The information transmission module 304 further transmits first acquisition period information relating to the first acquisition period to the authentication server 20. As described in the first embodiment, the first acquisition period is the period to which the first acquisition time point at which the salt is acquired belongs. In the example of FIG. 17, the hour "01" on the day "02" corresponds to the first acquisition period. The first acquisition period information is information that can identify the period the salt for which is to be used. In the example of FIG. 17, the time stamp "59:59" corresponds to the first acquisition period information. Accordingly, the time stamp "59:59" as used herein can be read as "first acquisition period information."

The information reception module 201 further receives the first acquisition period information from the user PC 30. In the example of FIG. 17, the information reception module 201 receives the time stamp "59:59" from the user PC 30 as the first acquisition period information. When the information reception module 201 receives the first acquisition period information, the salt request module 202 requests a salt from the salt server 10. The salt request is as described in the first embodiment to the sixth embodiment.

When the salt server 10 receives a request from the authentication server 20, the salt server 10 transmits, to the authentication server 20, a plurality of salts including a salt corresponding to a second acquisition period to which a second acquisition time point at which the salt is acquired belongs and a salt corresponding to a third period previous or subsequent to the second acquisition period. The combination of the day and time slot is an example of the second acquisition period. Accordingly, the combination of the day and time slot as used herein can be read as "second acquisition period." The second acquisition period is a period to which the second acquisition time point at which the salt is acquired belongs. The second acquisition period is different from the first acquisition period in that the second acquisition period is a period in which the salt corresponding to the inverse transformation information is acquired, but other points are the same as those of the first acquisition period.

For example, when the second acquisition time point is immediately before the end of the second acquisition period, the salt server 10 transmits a plurality of salts including the salt corresponding to the second acquisition period and the salt corresponding to the third period being the period subsequent to the second acquisition period. The phrase "immediately before the end" refers to within a predetermined time period (for example, within several seconds to one minute) from an end time point of the second acquisition period. In the example of FIG. 17, the second acquisition period is the hour "01" on the day "02". The end point of this second acquisition period is a time point (for example, "01:59:59" on the day "02") immediately before "02:00:00" on the day "02". In the example of FIG. 17, the second acquisition time point "01:59:59 on Dec. 2, 2021" is the same as or immediately before this end time point, and hence the salt server 10 transmits the salt "8414" for the hour "01" on the day "02", which is the second acquisition period, and the salt "9436" for the hour "02" on the day "02", which is the period subsequent to the second acquisition period.

For example, when the second acquisition time point is immediately after the second acquisition period, the salt server 10 transmits a plurality of salts including the salt corresponding to the second acquisition period and the salt corresponding to the third period being a period after the second acquisition period. The phrase "immediately after" refers to within a predetermined time period (for example, within several seconds to one minute) from a start time point of the second acquisition period. For example, in the example of FIG. 17, it is assumed that the second acquisition time point is "02:00:00 on Dec. 2, 2021" instead of "01:59:59 on Dec. 2, 2021." In this case, the second acquisition period is the hour "02" on the day "02". The start time point of this second acquisition period is "02:00:00" on the day "02". The second acquisition time point "02:00:00 on Dec. 2, 2021" is the same as or immediately after this start time point, and hence the salt server 10 transmits the salt "8414" for the hour "01" on the day "02", which is the period previous to the second acquisition period, and the salt "9436" for the hour "02" on the day "02", which is the second acquisition period.

The salt acquisition module 203 acquires the salt corresponding to the first acquisition period based on the first acquisition period information. The salt acquisition module 203 acquires the salt corresponding to the first acquisition period from among the plurality of salts received from the salt server 10 based on the first acquisition period information. In the example of FIG. 17, the salt acquisition module 203 selects any one of the pair of salts received from the salt server 10 based on the first acquisition period information. In the example of FIG. 17, the salt acquisition module 203 can identify based on the time stamp "59:59" that the salt for the earlier time is to be selected. Thus, the salt acquisition module 203 selects the first salt "8414". Processing for the inverse transformation performed after the salt "8414" is selected is the same as in the first embodiment to the sixth embodiment.

Meanwhile, in the example of FIG. 17, it is assumed that the time stamp is "00:00" instead of "59:59". In this case, the salt acquisition module 203 can identify based on the time stamp "00:00" that the salt for the later time is to be selected. Thus, the salt acquisition module 203 selects the second salt "9436". Processing for the inverse transformation performed after the salt "9436" is selected is the same as in the first embodiment to the sixth embodiment.

According to the authentication system S of the Modification Example 1, the user PC 30 further transmits a time stamp corresponding to a transformation time point of a TUID to the authentication server 20. The authentication server 20 acquires a salt based on the time stamp received from the user PC 30. Thus, multi-factor authentication can be performed accurately even when the salt is acquired immediately before the end of a certain time slot. This can save time and effort to perform a retry after failing in the multi-factor authentication, thereby enhancing the convenience of the user. The salt server 10, the authentication server 20, and the user PC 30 do not execute unrequired processing as well, and hence processing loads thereon can be reduced.

Further, when the salt server 10 receives a request from the authentication server 20, the salt server 10 transmits, to the authentication server 20, a plurality of salts including the salt corresponding to the second acquisition period and the salt corresponding to the third period previous or subsequent to the second acquisition period. The authentication server 20 acquires, based on the time stamp received from the user PC 30, a salt suitable for inverse transformation from among a plurality of salts. Accordingly, the inverse transformation can be executed with accuracy, and hence it is possible to save time and effort to perform a retry after failing in the multi-factor authentication.

7-2. Modification Example 2

For example, even when the transform function "f" and the inverse transform function $f^{-1}$ are selected as in the fourth embodiment (FIG. 11), there is a possibility that the same problem as in Modification Example 1 may occur. For example, it is assumed that the time point at which the user PC 30 performs transformation is "01:59:59 on Dec. 2, 2021" and the time point at which the authentication server 20 performs inverse transformation is "02:00:00 on Dec. 2, 2021." In this case, the transform function "f" for the TUID do not correspond to the inverse transform function $f^{-1}$ for the transformed TUID, and hence there is a possibility that the authentication server 20 cannot acquire the correct TUID.

In view of this, in Modification Example 2 of the present disclosure, it is assumed that, in the same manner as in Modification Example 1, the user PC 30 transmits the time stamp "59:59" to the authentication server 20. The authentication server 20 can identify, based on this time stamp, that, even when the time point at which the inverse transformation is performed is "02:00:00 on Dec. 2, 2021," it is only required to use the inverse transform function $f^{-1}$ corresponding to the previous time slot.

The information transmission module 304 further transmits transformation period information relating to the first transformation period to the authentication server 20. As described in the fourth embodiment, the first transformation period is a period to which the first transformation time point at which the salt is transformed belongs. In the above-mentioned example, the hour "01" on the day "02" corresponds to the first transformation period. The transformation period information is information that can identify the period the inverse transform function $f^{-1}$ for which is to be used. In the above-mentioned example, the time "59:59" corresponds stamp to the transformation period information. Accordingly, the time stamp "59:59" as used herein can be read as "the transformation period information." The information reception module 201 further receives the transformation period information from the user PC 30.

The inverse transform function selection module 208 selects the inverse transform function $f^{-1}$ corresponding to the first transformation period based on the transformation period information. Modification Example 2 is different from the fourth embodiment in that the inverse transform function $f^{-1}$ is selected based on the transformation period information instead of the time point of selecting the inverse transform function $f^{-1}$, but other points are the same as in the fourth embodiment. It suffices that the inverse transform function selection module 208 selects the inverse transform function $f^{-1}$ corresponding to the first transformation period from among the plurality of inverse transform functions $f^{-1}$ based on the transformation period information.

Modification Example 2 may be applied to a configuration that combines the fourth embodiment and the sixth embodiment. In this case, when the selection server 40 receives a request from the authentication server 20, the selection server 40 transmits, to the authentication server 20, a plurality of inverse transform functions $f^{-1}$ including the inverse transform function $f^{-1}$ corresponding to a second transformation period to which a second transformation time point at which the inverse transform function $f^{-1}$ is selected belongs and the inverse transform function $f^{-1}$ corresponding to the third period previous or subsequent to the second transformation period.

According to the authentication system S of Modification Example 2, the user PC 30 transmits the transformation period information relating to the first transformation period to the authentication server 20. The authentication server 20 selects, based on the transformation period information received from the user PC 30, the inverse transform function $f^{-1}$ corresponding to the first transformation period. This enhances security in multi-factor authentication. Even when the transformation of the TUID is executed immediately before the end of a certain time slot, the multi-factor authentication can be executed with accuracy. This can save time and effort to perform a retry after failing in the multi-factor authentication, thereby enhancing the convenience of the user. The salt server 10, the authentication server 20, and the user PC 30 do not execute unrequired processing as well, and hence processing loads thereon can be reduced.

7-3. Modification Example 3

For example, the authentication system S may include the salt acquisition module 302 that acquires a salt generated at random, the transformation module 303 that transforms, based on the salt, user identification information, which is different from the biometric information on the user, and can identify the user, and the multi-factor authentication module 205 that executes multi-factor authentication based on the user identification information transformed by the transformation module 303 and the biometric information. Details of individual processing are as described in the first embodiment to the sixth embodiment. The TUID corresponds to the user identification information. The user identification information is not limited to the TUID as long as the user identification information can identify the user in some way. For example, the user identification information may be a user ID, an email address, or a phone number. The user identification information is an example of the authentication information. It is assumed that the user database DB2 stores a pair of the biometric information and the user identification information serving as a correct answer.

The salt acquisition module 302, the transformation module 303, and the multi-factor authentication module 205 in Modification Example 3 of the present disclosure may implemented by one computer. When those are implemented by a plurality of computers, the salt acquisition module 302 and the transformation module 303 may be implemented by a first computer other than the user PC 30, and the multi-factor authentication module 205 may be implemented by a second computer other than the authentication server 20. The first computer transmits the transformed user identification information and the biometric information to the second computer. The second computer may execute multi-factor authentication based on those pieces of information received from the first computer.

According to the authentication system S of Modification Example 3, security can be enhanced for the same reasons as those of the first embodiment to the sixth embodiment.

7-4. Other Modification Examples

For example, the first embodiment to the sixth embodiment may be combined. The above-mentioned modification examples may be combined.

For example, the processing in Modification Example 1 or Modification Example 2 may be executed only immediately before the end of a certain time slot. For example, the functions described as being implemented by the salt server 10 may be implemented by the authentication server 20 or the user PC 30. In this case, the authentication system S is not required to include the salt server 10. For example, when the authentication system S includes a plurality of server computers, the functions may be shared among the plurality of server computers. Further, for example, the data described as being stored in the data storage units 100 and 200 may be stored by a computer other than the salt server 10 or the authentication server 20.

The invention claimed is:

1. An authentication system, comprising:

a user device; and an authentication device, a management device configured to store transformation information corresponding to combinations of days and time slots, wherein the user device is configured to:

transmit, to the management device, a first request for transformation information that comprise a randomly generated value, wherein the first request comprises a command that excludes information revealing an acquisition rule that the transformation information corresponds to a combination of a day and time slot;

acquire, from the management device, the transformation information that comprise the randomly generated value for transforming authentication information different from biometric information;

transform the authentication information based on the transformation information, wherein only the authentication information is transformed while maintaining the biometric information untransformed, wherein the authentication information is a temporary user ID that becomes invalid when a predetermined invalidation condition is satisfied; and transmit, to the authentication device, the transformed authentication information and the biometric information, and wherein the authentication device is configured to:

receive, from the user device, the transformed authentication information and the biometric information;

transmit, to the management device, a second request for inverse transformation information, wherein the second request comprises a command that excludes information revealing the acquisition rule;

acquire, from the management device, inverse transformation information comprising the randomly generated value for inversely transforming the transformed authentication information;

inversely transform the transformed authentication information based on the inverse transformation information;

execute multi-factor authentication based on the authentication information inversely transformed by the authentication device and the biometric information; and upon successful multi-factor authentication, generate a new temporary user ID different from the inversely transformed temporary user ID and transmit the new temporary user ID to the user device, wherein the user device is further configured to:

receive the new temporary user ID and replace the stored temporary user ID with the new temporary user ID for use in a subsequent authentication;

wherein both the user device and the authentication device independently acquire the randomly generated value from the management device based on a same time period without the transmission of the randomly generated value between the user device and the authentication device.

2. The authentication system according to claim 1, wherein the user device is configured to acquire the transformation information corresponding to a first acquisition period that comprises a first acquisition time point at which the transformation information is acquired, wherein the authentication device is configured to acquire the inverse transformation information corresponding to the first acquisition period, wherein the first acquisition period is represented by the combination of the day and time slot.

3. The authentication system according to claim 2, wherein the user device is configured to further transmit, to the authentication device, first acquisition period information relating to the first acquisition period, wherein the authentication device is configured to further receive the first acquisition period information from the user device, and wherein the authentication device is configured to acquire the inverse transformation information corresponding to the first acquisition period based on the first acquisition period information.

4. The authentication system according to claim 3, further comprising a management device configured to manage the inverse transformation information, wherein the authentication device is configured to request the management device for the inverse transformation information, wherein the management device is configured to transmit a plurality of pieces of the inverse transformation information to the authentication device when a request is received from the authentication device, the plurality of pieces of the inverse transformation information including the inverse transformation information corresponding to a second acquisition period that comprises a second acquisition time point at which the inverse transformation information is acquired and the inverse transformation information corresponding to a third period previous or subsequent to the second acquisition period, and wherein the authentication device is configured to acquire, based on the first acquisition period information, the inverse transformation information corresponding to the first acquisition period from among the plurality of pieces of the inverse transformation information.

5. The authentication system according to claim 1, wherein the user device is configured to acquire the transformation information corresponding to a part of the authentication information, wherein the user device is configured to further transmit, to the authentication device, an untransformed part, which is the part that has not been transformed by the user device, wherein the authentication device is configured to further receive the untransformed part from the user device, and wherein the authentication device is configured to acquire the inverse transformation information corresponding to the untransformed part.

6. The authentication system according to claim 1, wherein the management device is configured to associate predetermined identification information and the inverse transformation information with each other, wherein the user device is configured to acquire the predetermined identification information, wherein the user device is configured to further transmit the predetermined identification information to the authentication device, wherein the authentication device is configured to further receive the predetermined identification information from the user device, and wherein the authentication device is configured to acquire the inverse transformation information that comprises the predetermined identification information.

7. The authentication system according to claim 6, wherein the management device is configured to generate, when a predetermined generation request is received from the user device, the predetermined identification information and the transformation information and associate the predetermined identification information and the transformation information with each other, wherein the user device is configured to acquire the transformation information generated in response to the predetermined generation request, and wherein the user device is configured to acquire the predetermined identification information generated in response to the predetermined generation request.

8. The authentication system according to claim 1, wherein the user device is configured to select any one of a plurality of transformation methods, wherein the user device is configured to transform, based on the transformation information, the authentication information through use of the any one of the plurality of transformation methods selected by the user device, wherein the authentication device is configured to select an inverse transformation method corresponding to the any one of the plurality of transformation methods selected by the user device from among a plurality of the inverse transformation methods, and wherein the authentication device is configured to inversely transform, based on the inverse transformation information, the transformed authentication information through use of the inverse transformation method selected by the authentication device.

9. The authentication system according to claim 8, wherein the user device is configured to select one of the plurality of transformation methods corresponding to a first transformation period that comprises a first transformation time point at which the authentication information is transformed belongs, and wherein the authentication device is configured to select the inverse transformation method corresponding to the first transformation period as the inverse transformation method corresponding to the one of the plurality of transformation methods selected by the user device.

10. The authentication system according to claim 9, wherein the first transformation period corresponds to a time slot, wherein the user device is configured to select one of the plurality of transformation methods corresponding to the time slot, and wherein the authentication device is configured to select the inverse transformation method corresponding to the time slot.

11. The authentication system according to claim 9, wherein the user device is configured to further transmit, to the authentication device, transformation period information relating to the first transformation period, wherein the authentication device is configured to further receive the transformation period information from the user device, and wherein the authentication device is configured to select the inverse transformation method corresponding to the first transformation period based on the transformation period information.

12. The authentication system according to claim 8, wherein the management device is configured to associate predetermined identification information and the inverse transformation information with each other, wherein the user device is configured to acquire the predetermined identification information, wherein the user device is configured to further transmit the predetermined identification information to the authentication device, wherein the authentication device is configured to further receive the predetermined identification information from the user device, wherein the authentication device is configured to acquire the inverse transformation information that comprises the predetermined identification information, and wherein the authentication device is configured to select the inverse transformation method based on the predetermined identification information.

13. The authentication system according to claim 12, wherein the management device is configured to generate, when a predetermined generation request is received from the user device, the predetermined identification information and the transformation information and associate the predetermined identification information and the transformation information with each other, wherein the user device is configured to acquire the transformation information generated in response to the predetermined generation request, and wherein the user device is configured to acquire the predetermined identification information generated in response to the predetermined generation request.

14. The authentication system according to claim 8, further comprising a selection device configured to select one of the plurality of transformation methods and the inverse transformation method, wherein the user device is configured to request the selection device to select the one of the plurality of transformation methods, wherein the authentication device is configured to request the selection device to select the inverse transformation method, wherein the selection device is configured to:

transmit, when a request is received from the user device, a selection result of any one of the plurality of transformation methods to the user device; and transmit, when a request is received from the authentication device, a selection result of any one of the plurality of inverse transformation methods to the authentication device, wherein the user device is configured to select one of the plurality of transformation methods based on the selection result obtained by the selection device, and wherein the authentication device is configured to select the inverse transformation method based on the selection result obtained by the selection device.

15. An authentication method using a user device, an authentication device, and a management device, the authentication method comprising:

transmitting, by the user device and to the management device, a first request for transformation information that comprise a randomly generated value, wherein the first request comprises a command that excludes information revealing an acquisition rule that the transformation information corresponds to a combination of a day and time slot;

acquiring, by the user device and from the management device, the transformation information that comprise the randomly generated value for transforming authentication information different from biometric information;

transforming, by the user device, the authentication information based on the transformation information, wherein only the authentication information is transformed while maintaining the biometric information untransformed, wherein the authentication information is a temporary user ID that becomes invalid when a predetermined invalidation condition is satisfied;

transmitting, by the user device, to the authentication device, the transformed authentication information and the biometric information;

receiving, by the authentication device, from the user device, the transformed authentication information and the biometric information;

transmitting, by the authentication device, to the management device, a second request for inverse transformation information, wherein the second request comprises a command that excludes information revealing the acquisition rule;

acquiring, by the authentication device, from the management device, inverse transformation information comprising the randomly generated value for inversely transforming the transformed authentication information;

inversely transforming, by the authentication device, the transformed authentication information based on the inverse transformation information;

executing, by the authentication device, multi-factor authentication based on the authentication information inversely transformed in the inverse transformation step and the biometric information, upon successful multi-factor authentication, generating, by the authentication device, a new temporary user ID different from the inversely transformed temporary user ID and transmitting the new temporary user ID to the user device, receiving, by the user device, the new temporary user ID and replace the stored temporary user ID with the new temporary user ID for use in a subsequent authentication;

wherein both the user device and the authentication device independently acquire the randomly generated value from the management device based on a same time period without the transmission of the randomly generated value between the user device and the authentication device.

16. A non-transitory computer-readable information storage medium for storing a program for causing a user device communicable to/from an authentication device and a management device that executes multi-factor authentication to:

transmit, by the user device and to the management device, a first request for transformation information that comprise a randomly generated value, wherein the first request comprises a command that excludes information revealing an acquisition rule that the transformation information corresponds to a combination of a day and time slot;

acquire, by the user device and from the management device, the transformation information that comprise the randomly generated value for transforming authentication information different from biometric information;

transform, by the user device, the authentication information based on the transformation information, wherein only the authentication information is transformed while maintaining the biometric information untransformed, wherein the authentication information is a temporary user ID that becomes invalid when a predetermined invalidation condition is satisfied; and transmit, by the user device, to the authentication device, the transformed authentication information and the biometric information, upon successful multi-factor authentication, receive, by the user device, a new temporary user ID and replace a stored temporary user ID with the new temporary user ID for use in a subsequent authentication;

wherein both the user device and the authentication device independently acquire the randomly generated value from the management device based on a same time period without the transmission of the randomly generated value between the user device and the authentication device.

* * * * *